United States Patent [19]

Sakkab

[11] 4,256,598

[45] Mar. 17, 1981

[54] COMPOSITION FOR COMBINED WASHING AND BLEACHING OF FABRICS

[75] Inventor: Nabil Y. Sakkab, Maineville, Ohio

[73] Assignee: The Procter & Gamble Company, Cincinnati, Ohio

[21] Appl. No.: 2,414

[22] Filed: Jan. 10, 1979

[30] Foreign Application Priority Data

Jan. 11, 1978 [PH] Philippines ............................... 20644

[51] Int. Cl.³ ........................... C11D 7/32; C11D 7/56
[52] U.S. Cl. ........................................ 252/99; 252/95; 252/94; 8/101; 8/103
[58] Field of Search ................ 252/95, 99; 8/101, 103, 8/1 XA

[56] References Cited

U.S. PATENT DOCUMENTS

| | | |
|---|---|---|
| 2,951,797 | 9/1960 | Sharp . |
| 2,951,798 | 9/1960 | Sharp . |
| 3,927,967 | 12/1975 | Speakman ........................... 252/95 X |
| 4,033,718 | 7/1977 | Holcombe et al. ................. 252/99 X |
| 4,077,768 | 3/1978 | Johnston et al. ....................... 8/1 XA |
| 4,094,806 | 6/1978 | Wiers .................................. 252/95 X |
| 4,166,718 | 9/1974 | Reinert et al. ...................... 252/99 X |

OTHER PUBLICATIONS

Moser et al. Phthalocyamine Cmpds. pp. 308-321.
Lubs the Chemistry of Synthetic Dyes & Pigments A.C.S. Monograph 1972.

*Primary Examiner*—Mayer Weinblatt
*Attorney, Agent, or Firm*—William H. Gould; Thomas H. O'Flaherty; Richard C. Witte

[57] ABSTRACT

Combined washing and bleaching of cotton fabrics is accomplished by use of a composition comprising surfactant and a photoactivator. The surfactant is anionic, nonionic, semi-polar, ampholytic, or zwitterionic in nature. The photoactivator is a sulfonated porphine or mono-, di- or tri-aza porphine; metal free or metallated with Zn(II), Ca(II), Cd(II), Mg(II), Sc(III), Al(III) or Sn(IV).

19 Claims, 1 Drawing Figure

MECHANISM OF BLEACHING

P/A = PHOTOACTIVATOR
O = AN OXYGEN ATOM
hν = VISIBLE LIGHT RADIATION
ISC = INTERSYSTEM CROSSING

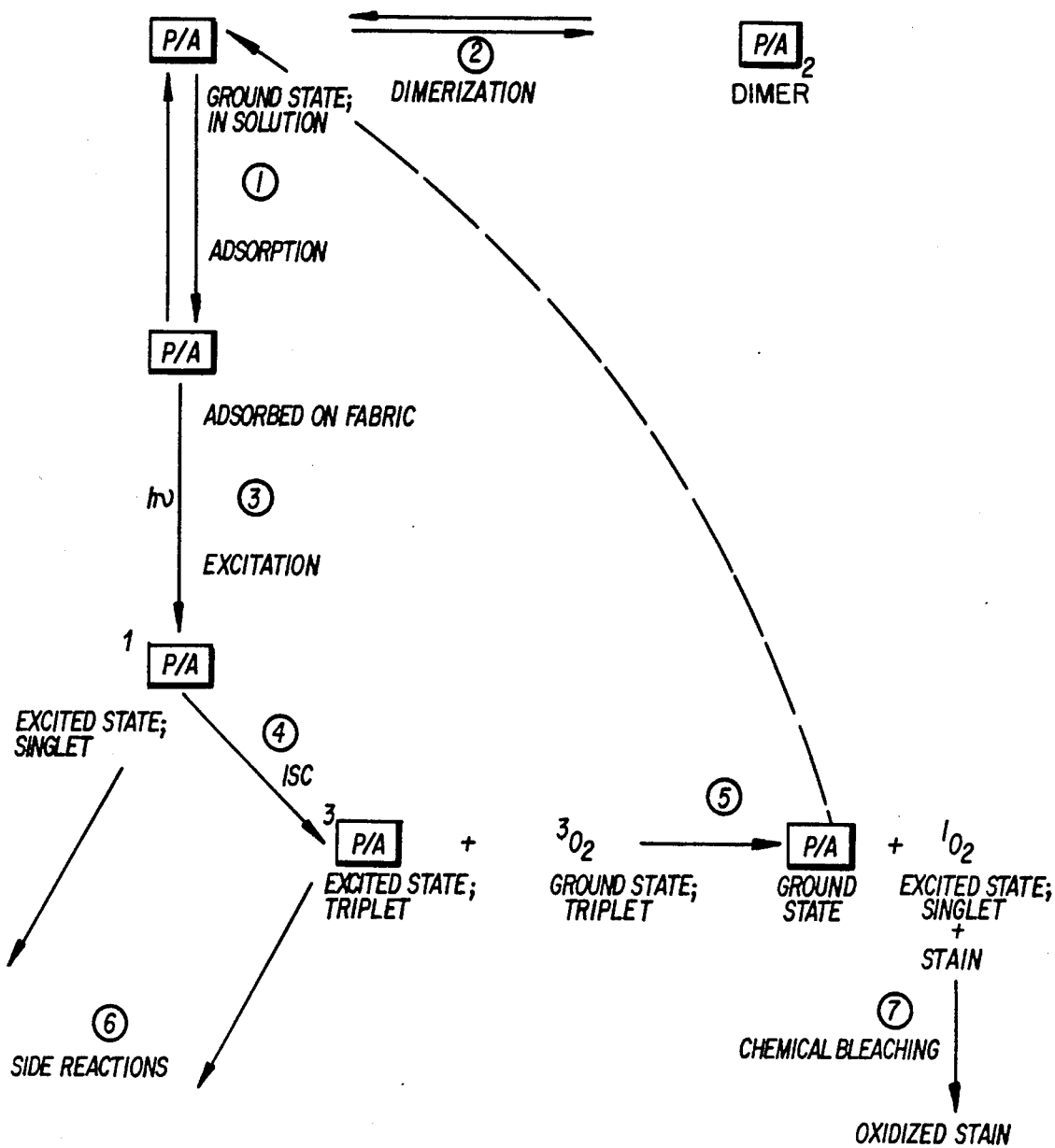

COMPOSITION FOR COMBINED WASHING AND BLEACHING OF FABRICS

BACKGROUND OF THE INVENTION

This invention relates to household laundry processes for combined washing and bleaching of cotton fabrics, and to simultaneous removal of stains and fugitive dyes.

U.S. Pat. No. 3,927,967 granted to Speakman on Dec. 23, 1975 related to a household washing and bleaching process for cotton fabrics utilizing photoactivating compounds, principally sulfonated zinc phthalocyanine, in the presence of visible light and atmospheric oxygen. Japanese Patent application OPI No. 50-113,479 assigned to The Proctor & Gamble Company, laid open to the public on Sept. 5, 1975, teaches the use of specific mixtures of sulfonated zinc phthalocyanine species, principally tri- and tetra-sulfonates, as preferred bleach photoactivators. In each of the foregoing references the detergent compositions utilizing sulfonated zinc phthalocyanine contained both organic surfactant and alkaline builder salt.

Belgian Pat. No. 840,348 invented by Wiers, granted on Oct. 4, 1976 discloses the use of zinc phthalocyanine tri- and tetra-sulfonates as bleach photoactivators in unbuilt liquid detergent compositions.

British Pat. No. 1,372,036 invented by Speakman and available to the public on Oct. 30, 1974 describes a washing machine provided with a source of visible light which irradiates wash liquor containing phthalocyanine photoactivator and fabrics.

U.S. Pat. Nos. 2,951,797; 2,951,798; 2,951,799 and 2,951,800, assigned to Monsanto Chemical Company and issued on Sept. 6, 1960 describe certain porphines as catalysts for the photo-oxidation of olefins.

It has now been found that certain other species of photoactivators perform a cotton fabric bleaching function similar to that of sulfonated phthalocyanines in the presence of visible light and atmospheric oxygen, and indeed under some circumstances are superior thereto. These other photoactivators provide in fact not only stain removal but also improved whitening of the fabrics in two other respects: the first of these is an improvement in the general whiteness of the fabrics, which is often referred to as whiteness maintenance; this improvement is not however accomplished in the ordinary way by reducing the reprecipitation of dirt upon cleaned fabrics, but rather by oxygen bleaching of the overall fabric discoloration that is often present in soiled fabrics even after washing with ordinary detergent compositions.

The second respect in which whiteness can be improved by the compositions of this invention is in the removal of so-called fugitive dyes—the tendency of some colored fabrics to release dye into the laundering solutions, which dye is then transferred during laundering onto other fabrics being washed therewith. Dye transfer removal using peroxy acids together with chemical activators is the subject of U.S. Pat. No. 3,822,114 granted on July 2, 1974 to Montgomery and Jones and commonly assigned U.S. patent application Ser. No. 583,383 filed on June 3, 1975 (Montgomery). Dye transfer removal using peroxy compounds such as hydrogen peroxide or sodium perborate catalyzed by porphines and phthalocyanines chelated with iron, and only iron, is the subject of commonly assigned U.S. patent application Ser. No. 697,006 filed on June 17, 1976 (Johnson and Tate).

The foregoing objects of this invention can be conveniently accomplished by a washing process which is followed by drying out-of-doors, especially in direct sunlight as on a clothesline. The common procedure of soaking fabrics in the wash/bleach solution prior to the actual washing process is an especially effective way to accomplish the objects of this invention.

SUMMARY OF THE INVENTION

This invention relates to a detergent bleach composition comprising an anionic, nonionic, semi-polar, ampholytic, or zwitterionic surfactant and from about 0.005% to about 0.5% by weight of the composition of a water soluble photoactivator having the formula

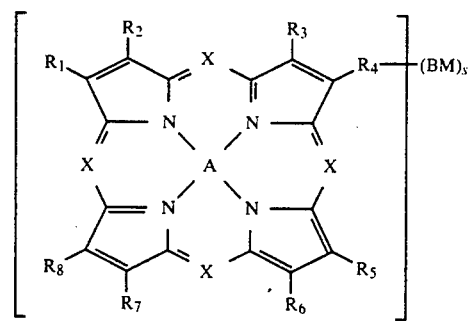

wherein each X is (=N—) or (=CY—), and the total number of (=N—) groups is 0, 1, 2, or 3; wherein each Y, independently, is hydrogen or meso substituted alkyl, cycloalkyl, aralkyl, aryl, alkaryl or heteroaryl; wherein each R, independently, is hydrogen or pyrrole substituted alkyl, cycloalkyl, aralkyl, aryl, alkaryl or heteroraryl, or wherein adjacent pairs of R's are joined together with ortho-arylene groups to form pyrrole substituted alicyclic or heterocyclic rings; wherein A is 2(H) atoms bonded to diagonally opposite nitrogen atoms, or Zn(II), Ca(II), Cd(II), Mg(II), Sc(III), Al(III), or Sn(IV); wherein B is a sulfonate group substituted into Y or R; wherein s is an integer from 3 to about 8 inclusive; and wherein M is a cation; provided that the sites of sulfonation are in substituent groups comprised of aromatic or pyrido groups substituted on R or aromatic or heterocyclic groups substituted on Y, the sulfonate groups are attached to carbon atoms no more than 5 atoms displaced from the porphine core, and the number of the sulfonate groups is no greater than the number of said substituent groups.

DETAILED DESCRIPTION OF THE INVENTION

The essential components of the instant invention are two in number. One is a surfactant which can be anionic, nonionic, semi-polar, ampholytic, or zwitterionic in nature, or can be mixtures thereof. Surfactants can be used at levels from about 10% to about 50% of the composition by weight, preferably at levels from about 15% to about 30% by weight.

Preferred anionic non-soap surfactants are water soluble salts of alkyl benzene sulfonate, alkyl sulfate, alkyl polyethoxy ether sulfate, paraffin sulfonate, alpha-olefin sulfonate, alpha-sulfocarboxylates and their esters, alkyl glyceryl ether sulfonate, fatty acid monoglyceride sulfates and sulfonates, alkyl phenol polyethoxy ether sulfate, 2-acyloxy-alkane-1-sulfonate, and beta-alkyloxy alkane sulfonate. Soaps are also preferred anionic surfactants.

Especially preferred alkyl benzene sulfonates have about 9 to about 15 carbon atoms in a linear or branched alkyl chain, more especially about 11 to about 13 carbon atoms. Especially preferred alkyl sulfate has about 8 to about 22 carbon atoms in the alkyl chain, more especially from about 12 to about 18 carbon atoms. Especially preferred alkyl polyethoxy ether sulfate has about 10 to about 18 carbon atoms in the alkyl chain and has an average of about 1 to about 12 —$CH_2CH_2O$— groups per molecule, especially about 10 to about 16 carbon atoms in the alkyl chain and an average of about 1 to about 6 —$CH_2CH_2O$— groups per molecule.

Especially preferred paraffin sulfonates are essentially linear and contain from about 8 to about 24 carbon atoms, more especially from about 14 to about 18 carbon atoms. Especially preferred alpha-olefin sulfonate has about 10 to about 24 carbon atoms, more especially about 14 to about 16 carbon atoms; alpha-olefin sulfonates can be made by reaction with sulfur trioxide followed by neutralization under conditions such that any sultones present are hydrolyzed to the corresponding hydroxy alkane sulfonates. Especially preferred alpha-sulfocarboxylates contain from about 6 to about 20 carbon atoms; included herein are not only the salts of alpha-sulfonated fatty acids but also their esters made from alcohols containing about 1 to about 14 carbon atoms.

Especially preferred alkyl glyceryl ether sulfates are ethers of alcohols having about 10 to about 18 carbon atoms, more especially those derived from coconut oil and tallow. Especially preferred alkyl phenol polyethoxy ether sulfate has about 8 to about 12 carbon atoms in the alkyl chain and an average of about 1 to about 10 —$CH_2CH_2O$— groups per molecule. Especially preferred 2-acyloxy-alkane-1-sulfonates contain from about 2 to about 9 carbon atoms in the aryl group and about 9 to about 23 carbon atoms in the alkane moiety. Especially preferred beta-alkyloxy alkane sulfonate contains about 1 to about 3 carbon atoms in the alkyl group and about 8 to about 20 carbon atoms in the alkyl moiety.

The alkyl chains of the foregoing non-soap anionic surfactants can be derived from natural sources such as coconut oil or tallow, or can be made synthetically as for example using the Ziegler or Oxo processes. Water solubility can be achieved by using alkali metal, ammonium, or alkanolammonium cations; sodium is preferred. Magnesium and calcium are preferred cations under circumstances described by Belgian Pat. No. 843,636 invented by Jones et al, issued Dec. 30, 1976. Mixtures of anionic surfactants are contemplated by this invention; a preferred mixture contains alkyl benzene sulfonate having 11 to 13 carbon atoms in the alkyl group and alkyl polyethoxy alcohol sulfate having 10 to 16 carbon atoms in the alkyl group and an average degree of ethoxylation of 1 to 6.

Especially preferred soaps contain about 8 to about 24 carbon atoms, more especially about 12 to about 18 carbon atoms. Soaps can be made by direct saponification of natural fats and oils such as coconut oil, tallow and fish oil, or by the neutralization of free fatty acids obtained from either natural or synthetic sources. The soap cation can be alkali metal, ammonium or alkanolammonium; sodium is preferred.

Preferred nonionic surfactants are water soluble compounds produced by the condensation of ethylene oxide with a hydrophobic compound such as an alcohol, alkyl phenol, polypropoxy glycol, or polypropoxy ethylene diamine.

Especially preferred polyethoxy alcohols are the condensation product of 1 to 30 mols of ethylene oxide with 1 mol of branched or straight chain, primary or secondary aliphatic alcohol having from about 8 to about 22 carbon atoms; more especially 1 to 6 mols of ethylene oxide condensed with 1 mol of straight or branched chain, primary or secondary aliphatic alcohol having from about 10 to about 16 carbon atoms; certain species of polyethoxy alcohols are commercially available from the Shell Chemical Company under the trade name 'Neodol'. Especially preferred polyethoxy alkyl phenols are the condensation product of about 1 to about 30 mols of ethylene oxide with 1 mol of alkyl phenol having a branched or straight chain alkyl group containing about 6 to about 12 carbon atoms; certain species of polyethoxy alkyl phenols are commercially available from the GAF Corporation under the trade name 'Igepal'.

Especially preferred polyethoxy polypropoxy glycols are commercially available from BASF-Wyandotte under the trade name 'Pluronic'. Especially preferred condensates of ethylene oxide with the reaction product of propylene oxide and ethylene diamine are commercially available from BASF-Wyandotte under the trade name 'Tetronic'.

Preferred semi-polar surfactants are water soluble amine oxides containing one alkyl moiety of from about 10 to 28 carbon atoms and 2 moieties selected from the group consisting of alkyl groups and hydroxyalkyl groups containing from 1 to about 3 carbon atoms, and especially alkyl dimethyl amine oxides wherein the alkyl group contains from about 11 to 16 carbon atoms; water soluble phosphine oxide detergents containing one alkyl moiety of about 10 to 28 carbon atoms and 2 moieties selected from the group consisting of alkyl groups and hydroxyalkyl groups containing from about 1 to 3 carbon atoms; and water soluble sulfoxide detergents containing one alkyl moiety of from about 10 to 28 carbon atoms and a moiety selected from the group consisting of alkyl and hydroxyalkyl moieties of from 1 to 3 carbon atoms.

Preferred ampholytic surfactants are water soluble derivatives of aliphatic secondary and tertiary amines in which the aliphatic moiety can be straight chain or branched and wherein one of the aliphatic substituents contains from about 8 to 18 carbon atoms and one contains an anionic water-solubilizing group, e.g. carboxy, sulfonate, sulfate, phosphate, or phosphonate.

Preferred zwitterionic surfactants are water soluble derivatives of aliphatic quaternary ammonium, phosphonium and sulfonium cationic compounds in which the aliphatic moieties can be straight chain or branched, and wherein one of the aliphatic substituents contains from about 8 to 18 carbon atoms and one contains an anionic water solubilizing group, especially alkyl-dimethyl-ammonio-propane-sulfonates and alkyl-dimethyl-ammonio-hydroxy-propane-sulfonates wherein the alkyl group in both types contains from about 14 to 18 carbon atoms.

A typical listing of the classes and species of surfactants useful in this invention appear in U.S. Pat. No. 3,664,961 issued to Norris on May 23, 1972 and hereby incorporated herein by reference. This listing, and the foregoing recitation of specific surfactant compounds and mixtures which can be used in the instant compositions, are representative of such materials but are not intended to be limiting.

The other essential component of the instant invention is a photoactivator as described hereinbelow. This component can also be described as a photochemical activator, or as a photosensitizer: these terms are synonymous. Before describing the photoactivator in detail, a discussion of chemical nomenclature will be appropriate. The structure of the compound porphine is:

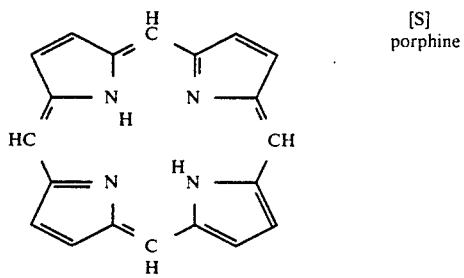

[S] porphine

Porphine has a large closed ring designated as a macrocyclic structure, and more specifically as a quadridentate macrocyclic molecule. Porphine can be described as tetramethine tetrapyrrole, and has also been designated as porphin or porphyrin. This structure is sometimes referred to herein as the porphine 'core', because the photoactivators of this invention are species of substituted porphines.

One form of substitution involves substituting 1, 2, 3, or 4 aza groups (=N—) for the methine groups (=CH—) in porphine. As an example of conventional nomenclature, a compound having 3 aza groups and one methine group is referred to as triaza porphine.

Another form of substitution involves substituting for one or more of the hydrogen atoms attached to the carbon atoms in the pyrrole rings of porphine. This can be substitution by an aliphatic or aromatic group, or can be orthofused polycyclic substitution as for example to form benzene or naphthalene ring structures. The compound having the common name 'phthalocyanine' contains 4 ortho-fused benzene rings, each substituted on a pyrrole ring of the porphine core; and also contains 4 aza groups substituted for the methine groups of the porphine core; it can therefore be designated tetrabenzo tetraaza porphine, and has the structure which follows. The numbers designate the positions of pyrrole substitution according to conventional nomenclature.

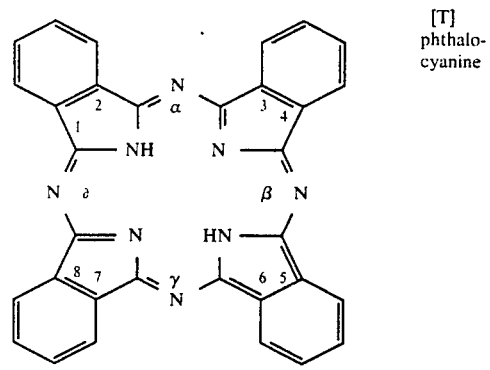

[T] phthalocyanine

Another form of substitution involves substituting for the hydrogen of the methine groups; this is conventionally referred to as meso substitution, and the positions of substitution are conventionally designated by Greek letters as illustrated on the phthalocyanine structure above.

Still another form of substitution is metallation by a heavy metal atom in a chelation structure: replacement of the two hydrogen atoms attached to two diagonally opposite inner nitrogen atoms of the four pyrrole groups by a heavy metal atom bonded to all four inner nitrogen atoms.

Still another form of substitution is substitution of a solubilizing sulfonate group into the photoactivator molecule.

The various forms of substitution described above can be illustrated by the compound 3-phenyl-2,7-disulfophenyl-α,γ-diaza-δ-benzofuryl-β-sulfobenzofuryl porphine zinc, trisodium salt, which is within the scope of this invention:

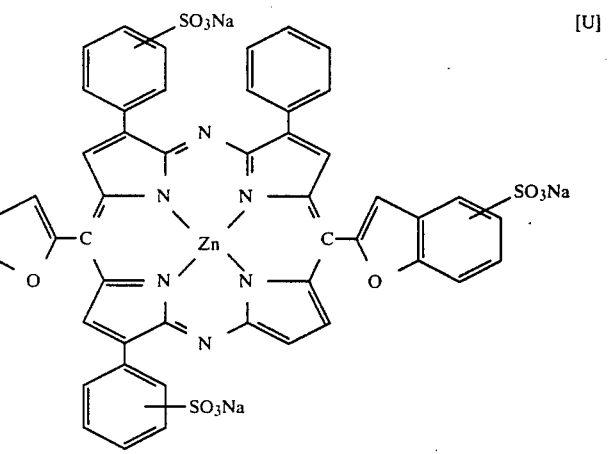

[U]

It will be noted that in the above compound the sulfonate groups are necessarily substituted on carbon atoms displaced no more than 5 atoms from the porphine core.

With the foregoing explanation as prelude, it is now possible to describe in detail the photoactivators of this invention. Referring to the structure shown hereinbefore in the SUMMARY OF THE INVENTION, effective photoactivators which are within the scope of this invention contain 0, 1, 2 or 3 aza groups [and, according to the nomenclature defined above, contain 4, 3, 2 or 1 methine groups, respectively].

The groups designated as R's in the structural formula above can, independently, be hydrogen or pyrrole substituted alkyl, cycloalkyl, aralkyl, aryl, alkaryl, or heteroaryl. Adjacent pairs of R's can also be joined together with ortho-arylene groups to form alicyclic or heterocyclic rings. Benzo substitution is especially preferred; i.e. $R_1$ and $R_2$, $R_3$ and $R_6$, and/or $R_7$ and $R_8$ are connected together pairwise by methylene groups to form fused benzene rings; tetrabenzo substitution is most especially preferred. Other preferred forms of pyrrole substitution are naphtho, pyrido, phenyl and naphthyl.

Substitutions can also be made for the hydrogen atoms of the methine groups of the photoactivators of this invention; thus each Y in the above structural formula can independently be hydrogen or meso substituted alkyl, cycloalkyl, aralkyl, aryl, alkaryl, or heteroaryl. It is preferred that Y is H, phenyl, naphthyl, thienyl, furyl, thioazyl, oxazyalyl, indolyl, benzothienyl, or pyridyl. H or phenyl are especially preferred. No meso substitution at all or tetra phenyl meso substitution are most especially preferred.

The photoactivating compounds of the instant invention can be unmetallated, A in the foregoing structural formula being comprised of two hydrogen atoms bonded to diagonally opposite inner nitrogen atoms of the pyrrole groups in the molecule [The characteristic structure of unmetallated compounds is illustrated by compounds [S] and [T] illustrated hereinbefore; these compounds are not, however, within the scope of this invention because they lack essential substituent groups as herein described.] Alternatively, the photoactivators of this invention can be metallated with zinc(II), calcium(II), cadmium(II), magnesium(II), scadium(III), aluminum(III), or tin(IV). Thus, altogether, A can be 2(H) atoms bonded to diagonally opposite N atoms, or Zn(II), Ca(II), Cd(II), Mg(II), Sc(III), Al(III) or Sn(IV). It is preferred that A be 2(H) or Zn(II).

At least 3 sulfonate groups are required per photoactivator molecule of this invention to provide sufficient water solubility. Sulfonation takes place on aromatic or pyrido groups substituted on pyrrole rings of the porphine core, or an aromatic or heterocyclic groups substituted in the meso position. The preferred forms of pyrrole and meso substitution recited hereinbefore are those groups which are preferred sulfonation sites and are convenient to make. Monosulfonation can readily be accomplished on each of the foregoing kinds of substituent groups; however disulfonation of individual substituent groups tends to cause decomposition of the underlying macromolecular structure. Hence the total number of the foregoing substituent groups must be at least three, and the number of sulfonate groups must be no greater than the number of the said foregoing substituent groups. More than eight sulfonate groups per photoactivator molecule are not desirable. Three to six sulfonate groups are preferred, and three or four sulfonate groups are especially preferred.

A further limitation upon the photoactivators of this invention is that the sites of sulfonation are on carbon atoms no more than 5 atoms displaced from the porphine core. Referring to Compound [U] whose structure is given above, it is apparent that the phenyl sulfonate groups are principally on carbon atoms 4 or 2 atoms displaced from the porphine core, while the benzofuryl sulfonate group must be on a carbon atom no more than 5 atoms so displaced.

M can be any cation that confers water solubility on the photoactivator molecule. Sodium is preferred; other operable cations are potassium, lithium, ammonium, and mono-, di-, and tri-ethanolamine.

Photoactivator usage in the compositions of this invention can be from about 0.005% to about 0.5% by weight of the composition. Preferable usage is from about 0.01% to about 0.1% by weight of the composition. The weight ratio of photoactivator to surfactant can be between about 1/10,000 and about 1/20, preferably between about 1/1000 and about 1/100.

Although it is not wished to be bound by theory, it is believed that the nature of this invention can be more clearly understood by postulating the mechanism of bleaching using the instant photoactivators. Referring to FIG. 1, the photoactivator in the upper left hand corner is in aqueous solution and is in its ground state. Reaction (1), entitled 'adsorption', indicates that dissolved photoactivator is in part adsorbed on fabrics. This is specific to cotton fabrics. Reaction (2) suggests that photoactivator can dimerize into a form which is not readily adsorbed and therefore is not available to enter into the desired bleaching reactions on the fabric surfaces.

Reaction (3) illustrates that photoactivator in the ground state can be excited by visible light, hv, and thereby raised to the excited singlet state. From the excited singlet state the photoactivator can undergo intersystem crossing or ISC, reaction (4), to the triplet state which is also excited but at a lower energy level than the singlet state. It is the excited triplet state that is desired because it is capable of interacting with the ground state of atmospheric oxygen molecules, which are also in the triplet state, forming thereby according to reaction (5) the excited singlet state of oxygen and also regenerating photoactivator at its original ground state. Both the singlet and the triplet excited states of the photoactivator can enter into reactions other than the desired reaction with oxygen. For example, the singlet state can fluoresce, while the triplet state can phosphoresce, undergo radiationless decay, undergo electron transfer to photoactivator molecules in the ground state which results in deactivation of the photoactivator, or react with other components of the solution. From the standpoint of the desired bleaching these are collectively designated as reaction (6), 'side reactions'.

The excited singlet oxygen, formed by reaction (5), is the oxidative species that is capable of reacting with stains as shown in reaction (7) to chemically bleach them to a colorless and usually water-soluble state, thereby accomplishing the purposes of this invention.

It will be instructive to consider the effect upon bleaching brought about by the individual species of photoactivators that are within the scope of this invention. This will be done in reference to the seven reactions appearing on FIG. 1 which have been described above.

The number of aza groups substituted for methine groups in the porphine core primarily affects (a) the lifetime of the triplet state, and (b) the side reactions. The lifetime of the triplet state of metalloporphines [Grayushko et al, Opt. Spektrosk 31, page 548 (1971)] is substantially greater than that of corresponding metallophthalocyanines [Vincett et al, J. Chem. Physics 55, No. 8 page 4134, October 1971]. It is believed that introduction of each successive aza group shortens the lifetime, and it is apparent that a longer lifetime is desired to provide greater opportunity for reaction with oxygen molecules to form the active bleaching species. Hence from this point of view methine groups are preferred to aza groups. However a countervailing factor is that side reactions tend to be greatest when 4 methine groups are present, and decrease progressively as successive aza groups are introduced. The foregoing effects work in opposite directions, and accordingly it is not possible to predict the relative effectiveness of the different species based on theoretical considerations alone. As described hereinafter, porphines having 0, 1, 2 and 3 aza groups are effective photoactivators, and the skilled artisan is free to select a photoactivator for reasons of cost, availability, and performance under specific conditions of interest to him.

This invention contemplates photoactivators that are metal free and also those that are metallated with certain metals. In general, the introduction of a metal atom into the photoactivator molecule causes a perturbation of the system which reduces the lifetime of the excited triplet states and increases side reactions, both of which are unwanted effects in relation to the instant invention. From this point of view unmetallated compounds are preferred photoactivators.

A countervailing factor is that manufacture of certain photoactivators is more readily accomplished when a metal is present to stabilize the molecule. This factor applies both to synthesis of a photoactivator compound by sulfonation of its unsulfonated precursor molecule, and also to synthesis of the precursor molecule itself.

Perturbation is especially great for metals which have unpaired electrons; hence paramagnetic metals are not satisfactory. Perturbation is also great for metals that are large in size. Data appearing in Vincett et al, op. cit., suggest that the lifetime of the triplet state of zinc phthalocyanine is hundreds of times longer than that of copper phthalocyanine (Cu is paramagnetic) and approaches a hundred times longer than that of platinum phthalocyanine (Pt is large).

Metallated photoactivators that are acceptable in the practice of this invention are those containing relatively small, diamagnetic metals: zinc(II), calcium(II), cadmium(II), magnesium(II), scandium(III), aluminum(III), and tin(IV). Because the first six of these named metals have essentially constant valence, specific identification of their valence states will sometimes be omitted herein. Zinc is preferred because the triplet state of zinc metallated photoactivators is perturbed to a relatively low extent and hence its lifetime is relatively long.

All of the reactions described on FIG. 1 are predicated on solubility of the photoactivator in the laundry bath. Solubilization is accomplished by introducing sulfonate groups into the molecule. It is entirely practical to make compounds having respectively, one, two, three, four and even indeed up to as many as twelve sulfonate groups per molecule, and all are to some extent photoactivators. However as each successive sulfonate group is added, changes occur monotonically in a number of properties which affect usefulness, as explained below.

The macrocyclic photoactivator molecule in solution is present in dissociated ionic form having negative charges around its periphery. The Coulombic effect of these negative charges is minimized by the counter ions in solution. The peripheral negative charges do, however, tend to localize the electron density of the ring near the center of the molecule and to enhance its basicity which leads to increased dimerization of the molecules as brought about by van der Waal forces [reaction 2, FIG. 1]. This circumstance is increased by multiple sulfonate groups and loss of symmetry, and hence the tendency to dimerize in solution follows the order mono < di < tetra < tri < penta ... Dimerization being an undesirable reaction, low degrees of sulfonation are preferred from this point of view.

On a cotton surface, which is negatively charged, multiple negative charges at the periphery of the molecule cause strong Coulombic repulsions which follow the order mono < di < tri < tetra < penta ... Hence adsorption, which is desired, is greatest for species having low degrees of sulfonation. Furthermore the adsorption which does take place tends, for the species having low degrees of sulfonation, to be closer to the fabric surface which also is desired.

Still another advantage of low degrees of sulfonation is fewer side reactions of the triplet state.

However, once again there are countervailing factors. The Coulombic repulsions of species having high degrees of sulfonation are widely distributed around the periphery of the adsorbed macrocyclic photoactivated molecule, which minimizes adsorption of successive layers of photoactivator on the fabric surface. However molecules of species having low degrees of sulfonation can geometrically orient in such a way as to minimize Coulombic repulsions and can build up multiple layers of photoactivator on the fabric surface. These multilayers are not desired: their intrinsic blue/green coloration becomes visible, and when irradiated by light they form singlet oxygen in a location sufficiently remote from the fabric surface that it is less effective for the desired stain removal. From these points of view desirability is in order ... > penta > tri > tetra > di > mono.

Still another advantage of high degrees of sulfonation is increased solubility in water.

Taking all the above into consideration, it has been found that the negative factors of mono- and di-sulfonated photoactivator molecules are so important that these species are unsatisfactory, and hence the photoactivators of this invention have three or more sulfonate groups per molecule. Compounds having more than about eight sulfonate groups per molecule are difficult to make and have no particular advantage. Hence the photoactivators of this invention have from three to about eight sulfonate groups per molecule; compounds having three to six sulfonate groups per molecule are preferred, and trisulfonated and tetrasulfonated species are especially preferred as having an optimum balance of maximum bleaching effectiveness and minimum coloration.

As stated hereinabove, the macromolecular structure comprising the porphine core contributes the essential photoactivation properties of the compounds of this invention. It follows inexorably that large numbers of compounds having this macromolecular core, but with myriads of different substituent groups, are effective in the practice of this invention. One versed in the art will recognize the impracticability of reducing to writing all possibilities that can be envisioned by a skillful practitioner. The embodiments which follow are therefore to be considered exemplary but not exhaustive. Photoactivators that are effective bleaching agents for fabrics and are within the scope of this invention are the following: α, β, γ, δ-tetrakis (sulfophenyl) porphine, tetra sodium salt; α, β, γ-tri (sulfophenyl)-δ (phenyl) porphine zinc, tri ammonium salt; α, β, γ, δ-tetrakis (2-thienyl, 5-sulfo) porphine zinc, tetra sodium salt; α, β, γ-tri (2-thienyl, 5-sulfo)-δ (2-thienyl) porphine magnesium, tri potassium salt; α, β, γ, δ-tetrakis (2-furyl, 5-sulfo) porphine, tetra ammonium salt; α, β, γ-tri (2-furyl, 5-sulfo)-δ (2-furyl) porphine, tri ammonium salt; trans-dichloro, α, β, γ, δ-tetrakis (2-thiazolyl, 3-sulfo) porphine tin (IV), tetra sodium salt; chloro α, β, γ, δ-tetrakis (2-thiazolyl, 4-sulfo) porphine scandium, tetra lithium salt; α, β, γ-tri (2-thiazolyl, 4-sulfo)-δ (2-thiazolyl) porphine zinc, tri ammonium salt; α, β, γ, δ-tetrakis (2-oxazolyl, 4-sulfo) porphine, tetra (mono ethanol amine) salt;

α, β, γ, δ-tetrakis (2-oxazolyl, 3-sulfo) porphine magnesium, tetra sodium salt; α, β, γ-tri (2-oxazolyl, 3-sulfo)-δ (2-oxazolyl) porphine cadmium, tri (tri ethanol amine) salt; α, β, γ, δ-tetrakis (4-pyridyl, mono sulfo) porphine zinc, tetra ammonium salt; α, β, γ-tri (4-pyridyl, mono sulfo)-δ (4-pyridyl) porphine, tri (di ethanol amine) salt; chloro, α, β, γ, δ-tetrakis (2-pyridyl, mono sulfo) porphine scandium, tetra potassium salt; trans-dichloro, α, β, γ-tri (2-pyridyl, mono sulfo)-δ (2-pyridyl) porphine tin (IV), tri ammonium salt; α, β, γ, δ-tetrakis (2-indolyl, monosulfo) porphine, tetra sodium salt; α, β, γ-tri (4-hydroxy, monosulfo phenyl)-δ (4-hydroxy phenyl) porphine, tri ammonium salt; 1, 2, 3, 4, 5, 6, 7, 8-octamethyl-α, β, γ, δ-tetrakis (sulfophenyl) porphine, tetra sodium salt, 1, 2, 3, 4, 5, 6, 7, 8-octaethyl-α, β, γ-tri (2-furyl, 5-sulfo)-δ (2-furyl) porphine zinc, tri sodium salt.

1, 2, 3, 4, 5, 6, 7, 8-octaisopropyl-α, β, γ, δ-tetrakis (2-oxazolyl, 4-sulfo) porphine cadmium, tetra ammonium salt; 1, 2, 3, 4, 5, 6, 7, 8-octa n-butyl-α, β, γ-tri (2-pyridyl, mono sulfo)-δ (2-pyridyl) porphine, tri sodium salt; 1, 2, 3, 4, 5, 6, 7, 8-octa sulfo phenyl porphine, octa sodium salt; 1, 2, 3, 4, 5, 6, 7, 8-octa sulfo phenyl porphine, octa sodium salt; 1, 2, 3, 4, 5, 6, 7, 8-octa sulfo phenyl porphine zinc, octa ammonium salt; 1, 2, 3, 4, 5, 6, 7, 8-octa sulfo naphthyl porphine znc, octa ammonium salt; 1, 2, 3, 4, 5, 6, 7, 8-octa sulfo naphthyl porphine zinc, octa ammonium salt; tetra sulfo benzo porphine, tetra (tri ethanol amine)salt; tetra sulfo benzo porphine zinc, tetra sodium salt.

Trans-dibromo, tetra sulfo benzo porphine tin (IV), tetra lithium salt; bromo, benzo tri sulfo benzo porphine scandium, tri ammonium salt; benzo tri sulfo benzo porphine tri(mono ethanol amine) salt; benzo tri sulfo benzo porphine magnesium, tri potassium salt; benzo tri sulfo benzo-meso-tetra phenyl porphine cadmium, tri sodium salt; benzo tri sulfo benzo-meso-tetra phenyl porphine zinc, tri sodium salt; trans-dichloro, benzo tri sulfo benzo-meso-tetra naphthyl porphine tin (IV), tri (di ethanol amine) salt; chloro, tetra sulfo pyrido porphine aluminum, tetra sodium salt; tetra sulfo pyrido porphine, tetra ammonium salt; tetra sulfo pyrido porphine zinc, tetra sodium salt.

Tri sulfo pyrido porphine, tri ammonium salt; tri sulfo pyrido porphine calcium, tri ammonium salt; tri sulfo pyrido porphine, tri sodium salt; meso-disulfopyrryl-meso-disulfo phenyl porphine, tetra sodium salt; meso-disulfopyrryl-meso-disulfo phenyl porphine zinc, tetra sodium salt; meso-disulfopyrryl-meso-disulfo phenyl porphine, tetra sodium salt; 1, 2, 3, 4, 5, 6, 7, 8-octamethyl-meso-disulfopyrrylmeso-disulfo phenyl porphine, tetra ammonium salt; 1, 2, 3, 4, 5, 6, 7, 8-octa n-propyl-meso-disulfopyrryl-meso-disulfo phenyl porphine zinc, tetra sodium salt; disulfobenzomeso-tetrasulfophenyl porphine, hexa sodium salt; disulfobenzomeso-tetra(sulfo-4-pyridyl) porphine zinc, hexa sodium salt.

Dibenzo-meso-tetra-(2-thienyl-5-sulfo) porphine, tetra ammonium salt; dibenzo-meso-tetra-(2-furyl-5-sulfo) porphine zinc, tetra sodium salt; benzo-sulfobenzo-meso-tetra-(2-thiazolyl-3-sulfo) porphine, penta sodium salt; benzotrisulfobenzo-meso-tetra-(2-thiazolyl-3-sulfo) porphine zinc, hepta sodium salt; disulfobenzo-meso-di(2-oxazolyl-3-sulfo)-di(2-oxazolyl) porphine, tetra sodium salt; disulfobenzo-meso-di(2-oxazolyl-4-sulfo) porphine zinc, tetra sodium salt; trisulfobenzo-α, β, γ-tri(sulfo-2-pyridyl)-δ-pyridyl porphine, hexa sodium salt; disulfobenzo-α, β, γ-tri(sulfo-2-indolyl)-δ-indolyl porphine, penta ammonium salt; disulfobenzo-α, β, γ-tri(sulfo-4-hydroxyphenyl)-δ-hydroxyphenyl porphine zinc, penta ammonium salt; tetrasulfo-naphtho porphine, tetra ammonium salt.

Trisulfo naphtho porphine zinc, tri ammonium salt; disulfo benzo disulfo naphthyl porphine zinc, tetra ammonium salt; disulfo benzo sulfo naphthyl porphine, tri ammonium salt; mono sulfo benzo disulfo naphthyl porphine, tri ammmonium salt; tetra sulfo benzo-meso-tetramethyl porphine, tetra ammonium salt; trisulfo benzo-meso-tetraethyl porphine zinc, tri ammonium salt; tetrasulfo benzo-meso-tetraisopropyl porphine zinc, tetra ammonium salt; trisulfo benzo-mesa-tetra n-butyl porphine, tri ammonium salt; tetrasulfo naphtho-α, β, γ-tri phenyl-δ-sulfophenyl porphine, penta ammonium salt; trisulfo naphtho-meso sec-butyl porphine zinc, tri ammonium salt.

Tetrasulfo naphtho-meso tert-butyl porphine zinc, tetra ammonium salt; trisulfo naphtho-meso-n-propyl porphine, tri ammonium salt; tetra sulfo benzo triaza porphine, tetra sodium salt; tetrasulfo benzo triaza porphine zinc, tetra sodium salt; tetrasulfo benzo triaza porphine, tetra ammonium salt; tetrasulfo benzo-α, β, γ-triaza-δ-sulfophenyl porphine zinc, penta ammonium salt; tetrasulfo benzo diaza porphine, tetra ammonium salt; tetrasulfo benzo diaza porphine zinc, tetra sodium salt; tetrasulfo benzo diaza porphine, ammonium salt; tetrasulfo benzo diaza porphine zinc, tetra sodium salt.

Tetrasulfo benzo-α-aza-β, γ, δ-triethyl porphine zinc, tetra ammonium salt; tetrasulfo benzo mono aza porphine, tetra sodium salt; tetrasulfo benzo mono aza porphine zinc, tetra ammonium salt; tetrasulfo benzo mono aza porphine, tetra sodium salt; trisulfo benzo triaza porphine, tri sodium salt; trisulfo benzo triaza porphine zinc, tri sodium salt; tri-sulfo benzo diaza porphine, tri sodium salt; trisulfo benzo-α, β-diaza-γ, δ-disulfo naphthyl porphine, hexa sodium salt; trisulfo benzo monoaza porphine, tri sodium salt; tri-sulfo benzo monoaza porphine zinc, tri ammonium salt.

Tetrasulfo naphtho triaza porphine zinc, tetra ammonium salt; tetrasulfo naphtho triaza porphine, tetra ammonium salt; tetrasulfo naphtho diaza porphine, tetra ammonium salt; tetrasulfo naphtho-α, γ-diaza-β, δ-diphenyl porphine zinc, tetra ammonium salt; tetrasulfo naphtho monoaza porphine zinc, tetra ammonium salt; tetrasulfo naphtho monoaza porphine, tetra ammonium salt; trisulfo naphtho triaza porphine, tri sodium salt; trisulfo naphtho diaza porphine zinc, tri sodium salt; trisulfo naphtho monoaza porphine zinc, tri ammonium salt; tetrasulfo dibenzo dinaphtho triaza porphine zinc, tetra sodium salt.

Tetrasulfo dibenzo dinaphtho diaza porphine, tetra ammonium salt; tetrasulfo benzo trinaphtho monoaza porphine, tetra ammonium salt; trisulfo tribenzo naphtho triaza porphine, tri ammonium salt; trisulfo dibenzo dinaphtho diaza porphine zinc, tri sodium salt; trisulfo dibenzo dinaphtho monoaza porphine zinc, tri sodium salt; α, β, γ-trisulfo pyrryl-δ-sulfophenyl porphine zinc, tetra sodium salt; γ-sulfo pyrryl-β, γ, δ-trisulfo phenyl porphine, tetra sodium salt; α-sulfo furyl-β, γ, δ-trisulfo phenyl porphine zinc, tetra sodium salt; meso-disulfo pyrryl-meso-disulfo phenyl porphine zinc, tetra sodium salt; 1,3,5,7-tetra methyl-α, β, γ, δ-tetrakis(sulfophenyl) porphine, tetra sodium salt.

1,3,5,7-tetra phenyl-α, β, γ, δ-tetrakis(2-oxazolyl, 4-sulfo) porphine magnesium, tetra sodium salt; sulfobenzo-α, β, γ-tri(2-thienyl-5-sulfo) porphine cadmium, tetra potassium salt; trisulfobenzo-α, β, γ-(2-furyl-5-sulfo) porphine, tetra ammonium salt; 1,2,3,4,5,6,7,8-penta sulfo phenyl porphine zinc, penta sodium salt; 1,2,3,4,5,6,7,8-hexasulfo phenyl porphine, hexa sodium salt; chloro, heptasulfo naphthyl porphine aluminum, hepta sodium salt; tetrasulfo benzo-meso-disulfo phenyl porphine calcium, hexa sodium salt; disulfo benzo-meso-tetrasulfo phenyl porphine, hexa sodium salt; 1,2,3,4,5,6,7,8-tetraphenyl-tetrasulfo phenyl-α, β, γ, δ-tetrakis-2-benzo thienyl porphine zinc, tetra sodium salt; α, β, γ, δ-tetrakis(4-methoxy sulfo phenyl) porphine, tetra sodium salt.

Each of the foregoing illustrative photoactivators is a specific chemical compound. It should be understood that alternative photoactivators, each within the scope of the instant invention, are those wherein substituted in each specific named compound are, inter alia:

(a) instead of the specific salt cation listed: sodium, potassium, lithium, ammonium, monoethanolamine, diethanolamine, or triethanolamine salts.

(b) instead of the metallation listed: zinc(II), calcium(II), cadmium(II), magnesium(II), scandium(III), aluminum(III), tin(IV), or metal free.

(c) instead of the specific alkyl groups mentioned: methyl, ethyl, n-propyl, isopropyl, n-butyl, isobutyl, sec-butyl, or tertbutyl.

(d) instead of the number of sulfo groups mentioned: any number between 3 and 8 inclusive that is not greater than the number of pyrrole-substituted aromatic or pyrido groups plus the number of meso-substituted aromatic or heterocyclic groups.

(e) instead of the specific pyrrole substituents mentioned: benzo, naphtho, pyrido, phenyl or naphthyl.

(f) instead of the specific meso substituents mentioned: phenyl, naphthyl, thienyl, furyl, thioazyl, oxazyalyl, indolyl, benzothienyl, or pyridyl.

The alternative photoactivator compounds described above are to be considered equally illustrative of the compounds of this invention as the compounds specifically named in the preceding list.

Certain preferred photoactivators are those wherein each R is H, Y is meso-substituted phenyl, and each B is substituted into Y. Other preferred photoactivators are those wherein $R_1$ and $R_2$, $R_3$ and $R_4$, $R_5$ and $R_6$, and $R_7$ and $R_8$ are each joined together pairwise by methylene groups to form fused benzene rings (i.e. pyrrole substituted benzo); wherein each Y is H; and wherein each B is substituted into R. Especially preferred photoactivators are: meso-phenyl trisulfophenyl porphine, sodium salt; meso-phenyl trisulfophenyl porphine zinc, sodium salt; meso-phenyl tetrasulfophenyl porphine, sodium salt, meso-phenyl tetrasulfophenyl porphine zinc, sodium salt; benzo trisulfobenzo porphine, sodium salt; benzo trisulfobenzo porphine zinc, sodium salt; benzo tetrasulfo porphine, sodium salt; benzo tetrasulfo porphine zinc, sodium salt; benzo trisulfobenzo monoaza porphine, sodium salt; benzo trifulsobenzo monoaza porphine zinc, sodium salt.

Tetrasulfobenzo monoaza porphine, sodium salt; tetrasulfobenzo monoaza porphine zinc, sodium salt; benzo trisulfobenzo diaza porphine, sodium salt; benzo trisulfobenzo diaza porphine zinc, sodium salt; tetrasulfobenzo diaza porphine, sodium salt; tetrasulfobenzo diaza porphine zinc, sodium salt; benzo trisulfobenzo triaza porphine, sodium salt; benzo trisulfobenzo triaza porphine zinc, sodium salt; tetrasulfo triaza porphine, sodium salt; tetrasulfo triaza porphine zinc, sodium salt.

The literature contains references to numerous means of preparation of porphine and its derivatives, i.e. to the photoactivators of this invention. One skilled in the art of porphine or phthalocyanine chemistry will have no difficulty selecting a synthesis appropriate for his particular purposes. Some of the synthesis reactions are accompanied by side reactions; in these cases conventional means of separation and purification are needed, such as chromatographic techniques, in a manner also detailed in the literature and well known to the skilled practitioner.

One convenient way to prepare porphines is to react substituted or unsubstituted heterocyclic or aromatic carboxaldehydes with substituted or unsubstituted pyrroles. By varying the substituent groups of one or the other or both of these reactants, a great variety of porphine derivatives can be obtained. For example,

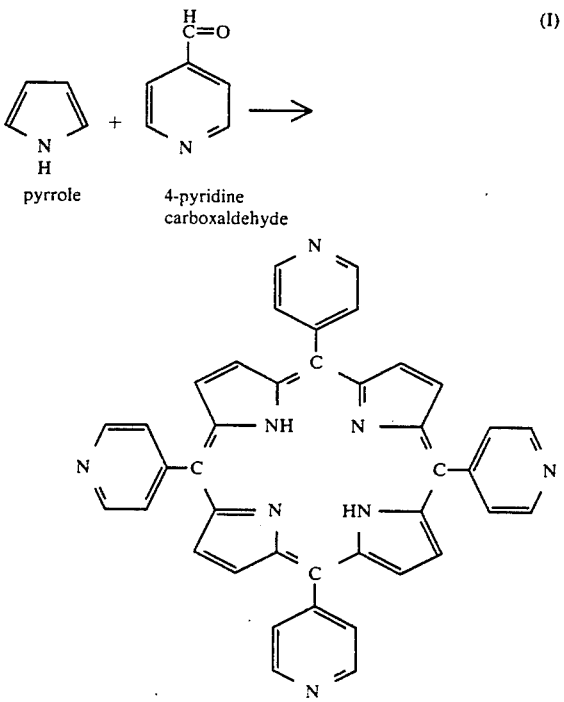

α, β, γ, δ -tetrakis(4-pyridyl)porphine

The stability of the quadridentate macromolecular structure is such that the reaction proceeds as described above. For convenience, the product is frequently and conventionally described by showing only one quarter of this symmetrical structure. It will be appreciated this structure is stabilized by resonance, and the bonds of all four quarters of the structure are alike, even though conventionally they are drawn in just one of the resonating structures. Accordingly, compound (I) above can be illustrated more simply as:

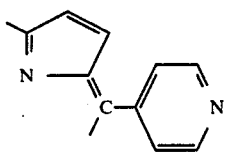
(I)

When pyrrole is reacted with 2-thiophene carboxaldehyde instead of 4-pyridine carboxaldehyde, the reaction proceeds as follows:

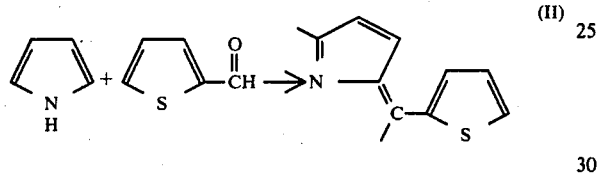
(II)

Other comparable reactions with pyrrole and substituted pyrrole are given below. It will be understood that substitutent groups which are present on either of the reactants will carry over into the corresponding porphine derivative, thereby making possible a great variety of compounds that have the essential characteristics necessary for the practice of this invention. The specific equations below are therefore exemplary and are not intended to be limiting.

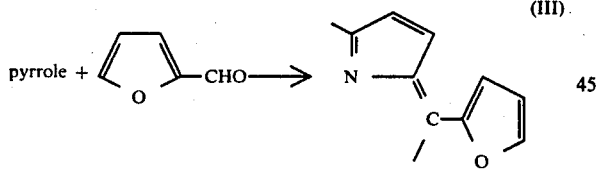
(III)

2-furan carboxaldehyde     α, β, γ, δ-tetrakis-(2-furyl)porphine

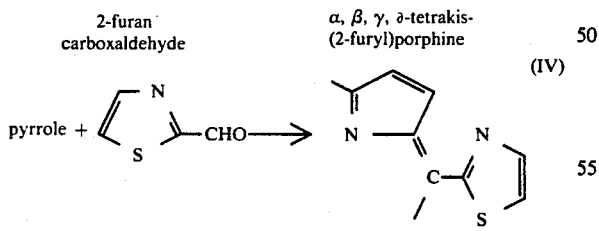
(IV)

2-thiazole carboxaldehyde     α, β, γ, δ-tetrakis-(2-thioazyl)porphine

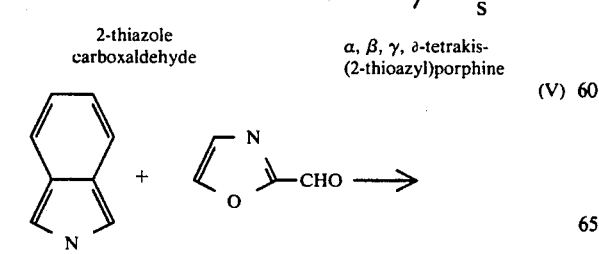
(V)

isoindole [benzopyrrole]     2-oxazole carboxaldehyde

-continued

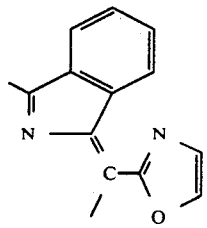

α, β, γ, δ-tetrakis-(2-oxazolyl)tetrabenzo porphine (VI)
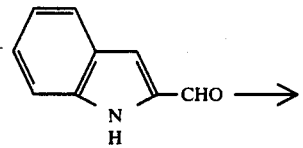

indole 2-carboxaldehyde

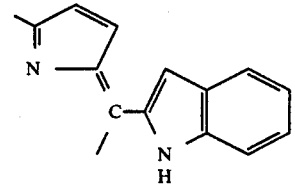

α, β, γ, δ-tetrakis-(2-indolyl)porphine (VII)
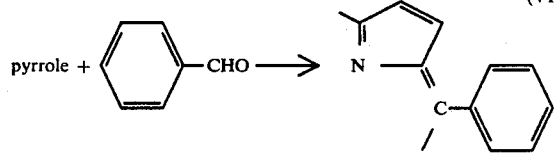

benzaldehyde     α, β, γ, δ-tetraphenyl porphine (VIII)
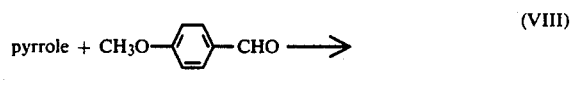

4-methoxy benzaldehyde

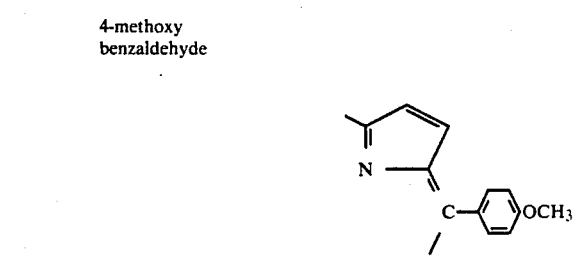

α, β, γ, δ-tetrakis (4-methoxy phenyl)porphine

-continued

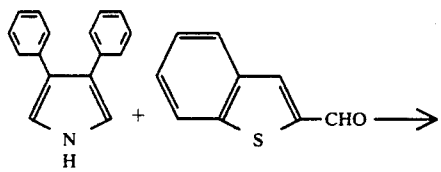

3,4-diphenyl pyrrole 2-benzo thiophene carboxaldehyde

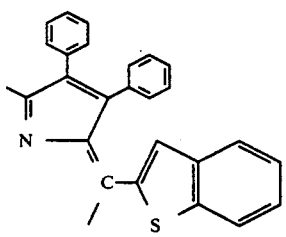

α, β, γ, δ-tetrakis-(2-benzothienyl)-1,2,3,4,5,6,7,8-octaphenyl porphine (X)

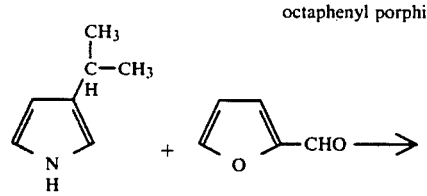

3-isopropyl pyrrole 2-furan carboxaldehyde

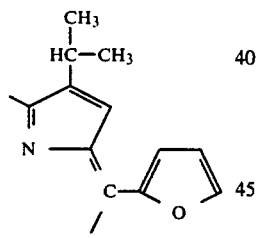

α, β, γ, δ-tetrakis-(2-furyl)-1,3,5,7-tetra isopropyl porphine

The above class of reactions can be carried out by refluxing in propionic acid for about 30 to 60 minutes followed by chromatographic purification. This method is described by Adler in J. Organic Chemistry, volume 32 page 476 (1967) which is herein incorporated by reference.

Any of the resultant metal-free compounds can be converted to the corresponding metallated compound by heating with a metal salt of Zn(II), Ca(II), Cd(II), Mg(II), Sc(III), Al(III) or Sn(II) in an appropriate solvent. [The Sn(II) becomes oxidized in the process, such that the photoactivator is metallated by Sn(IV).]. For example, heating α,β,α,δ-tetrakis(4-pyridyl) porphine in dimethylformamide in the presence of zinc acetate yields α,β,α,δ-tetrakis(4-pyridyl) porphine zinc. This method is described by Adler in J. Inorganic Nulcear Chemistry, volume 32, pages 2443-5 (Pergamon Press Inc., Great Britain, 1970) which is herein incorporated by reference.

Alternatively, a metallated derivative can be prepared by carrying out the synthesis reactions [e.g. (I) through (X) above] in the presence of a salt of the desired metal. For example, if cadmium chloride is present while carrying out reaction (IV), the resultant photoactivator compound is α,βγ, δ-tetrakis-(2-thioazyl)porphine cadmium. This reaction for producing a metallated compound may be preferred because the presence of the metal tends to increase stability of the desired quadridentate structure and tends to minimize the formation of other reaction products.

A completely different route to porphine compounds having fused ring substitution on the pyrrole rings is the condensation and rearrangement of 4 molecules of cyano aromatic or cyano heterocyclic ketones to form a quandridentate structure. This is done by heating in the presence of metallic zinc, calcium, cadmium, magnesium, scandium, aluminum, or tin, or a metal salt of Zn(II), Ca(II), Cd(II), Mg(II), Sc(III), Al(III), or Sn(II), and yields the corresponding metallated porphine.

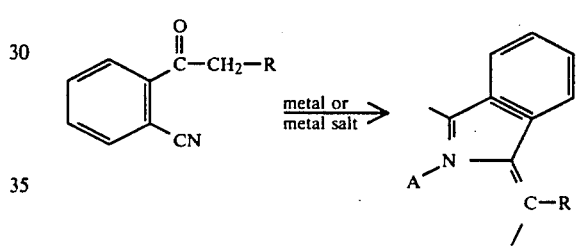

where A is zinc(II), calcium(II), cadmium(II), magnesium(II), scandium(III), aluminum(III) or tin(IV) and where R is hydrogen, alkyl, aryl, or mixtures thereof. Specific examples are:

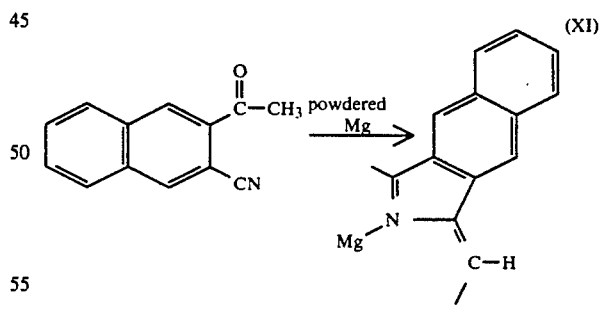

o-cyano-acetonaphthone tetra naphtho porphine magnesium (XI)

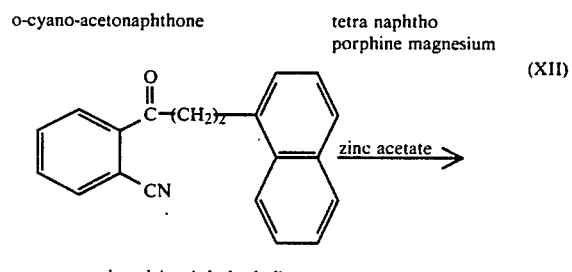

o-cyanophenyl-(naphthyl ethyl) ketone (XII)

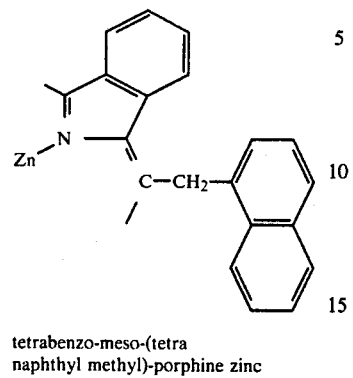

tetrabenzo-meso-(tetra naphthyl methyl)-porphine zinc

Similarly, condensation and rearrangement of imides and aromatic vicinal dinitriles yields aza porphine structures as does condensation and rearrangement of aromatic vicinal dicarboxylic acids in the presence of ammonia. Molybdic or tungstic acid or metallic antimony can be employed, as desired, to accelerate the reactions. For example:

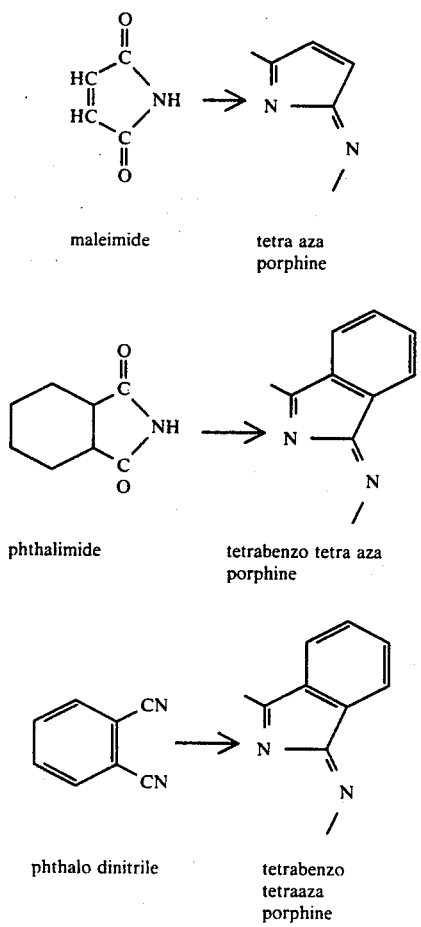

(XIII)

maleimide → tetra aza porphine (XIV)

phthalimide → tetrabenzo tetra aza porphine (XV)

phthalo dinitrile → tetrabenzo tetraaza porphine

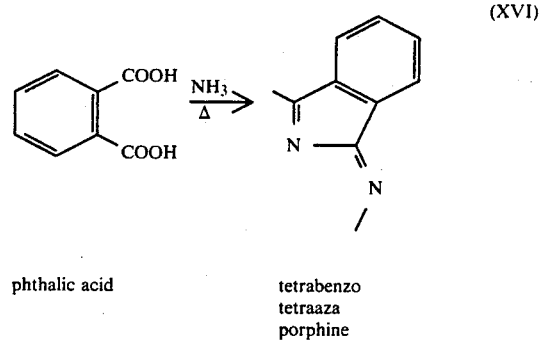

(XVI)

phthalic acid → tetrabenzo tetraaza porphine

A mixture of metal cyanide together with a ketone whose two side groups are (alkyl or aryl) and (halo aryl or halo heterocyclic), respectively, yields a mixture of mono- and di-aza porphines. For example:

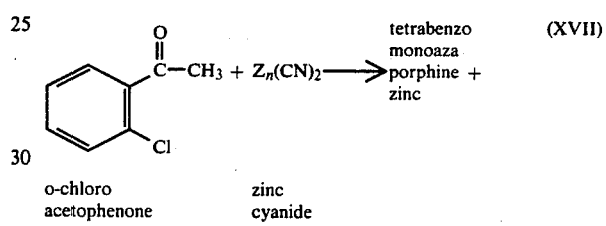

(XVII)

o-chloro acetophenone + zinc cyanide → tetrabenzo monoaza porphine + zinc

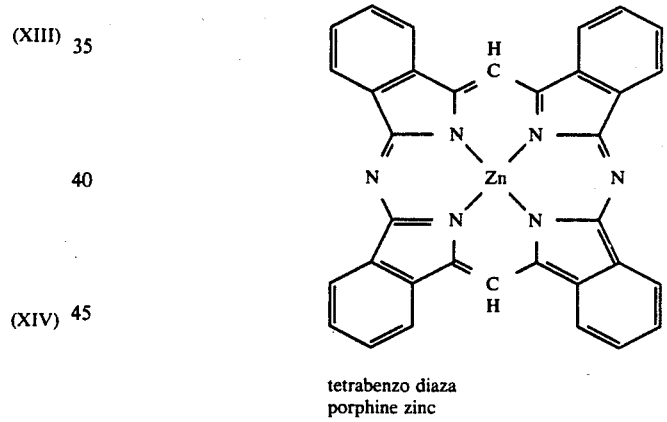

tetrabenzo diaza porphine zinc

Similarly, a mixture of phthalonitrile and a ketone whose side groups are (alkyl or aryl) and (cyanoaryl or cyanoheterocyclic), respectively, yields a mixture of mono- and di-aza porphines. Substitution of the meso-carbon atoms can be varied by appropriate choice of ketone.

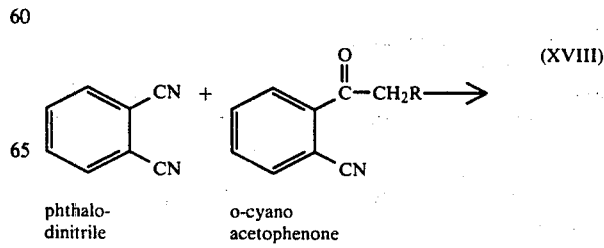

(XVIII)

phthalo-dinitrile + o-cyano acetophenone →

-continued

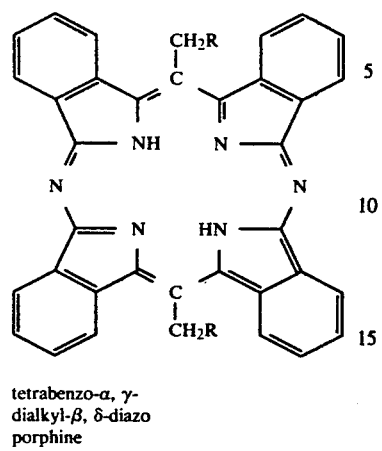

tetrabenzo-α, γ-dialkyl-β, δ-diazo porphine

An especially versatile method of preparing mono-, di-, and tri-aza porphines uses mixtures of pyrroles and carboxaldehydes [starting materials for porphines, as illustrated by equations (III) through (X) supra] together with dinitriles or imides [starting materials for aza porphines, as illustrated by equations (XIII) through (XV) supra]. Through suitable proportionation of the starting materials, mixtures of reaction products are obtained that are primarily mono-, di-, or tri-aza porphines, as desired. If pure species are desired, these reaction products can be purified by ordinary chromatographic techniques. Examples of the above reactions are:

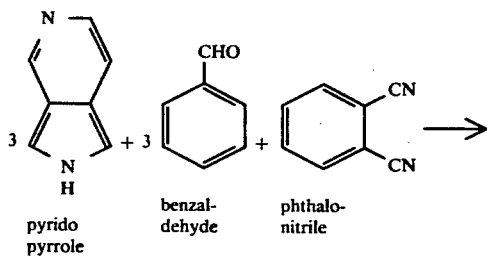

pyrido pyrrole / benzaldehyde / phthalonitrile (XIX)

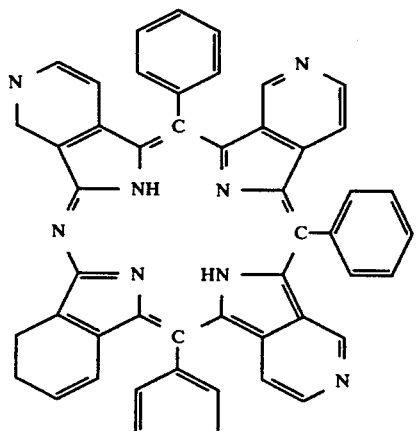

predominantly 1,2,3,4,5,6-tri-pyrido-7,8-benzo-α,β,γ-triphenyl-δ monoaza porphine -continued

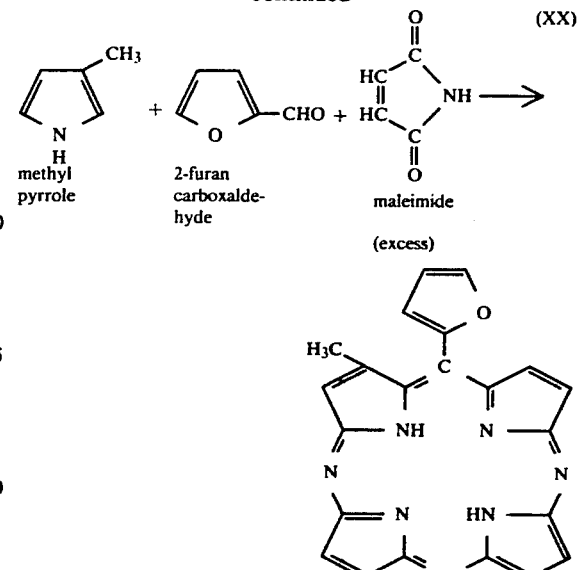

methyl pyrrole + 2-furan carboxaldehyde + maleimide (excess) → predominantly 2-methyl-α(2-furyl)-β,γ,δ-triaza porphine

A mixture of phthalonitrile, a metal salt, and methylene phthalimidene or phthalimideneacetic acid yields triazaporphine, as shown below. Varying the substituent groups forms substituted triaza porphines according to usual chemical principles.

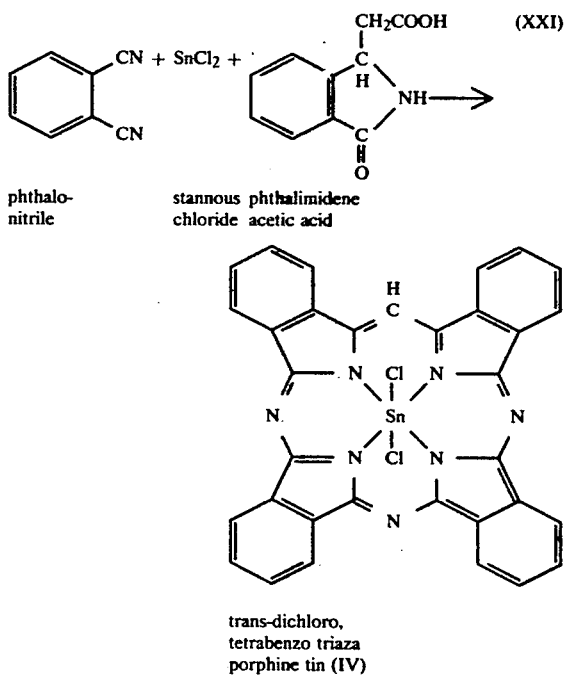

phthalonitrile + SnCl₂ + stannous phthalimidene chloride acetic acid → (XXI)

trans-dichloro, tetrabenzo triaza porphine tin (IV)

When the foregoing condensation method is used, unmetallated derivatives can be prepared by treatment with concentrated sulfuric acid followed by dilute alkali with cooling, as described by Helberger in Annalen 529, 305 (1937) which is herein incorporated by reference.

Many of the reactants used in the foregoing methods of preparation are commonly known and readily available to the skilled organic chemist. Certain general methods of synthesis can be described below, as follows:

Substituted pyrroles can be prepared by heating 1,4 dicarbonyl compounds (diacids or keto acids) with ammonia. For example,

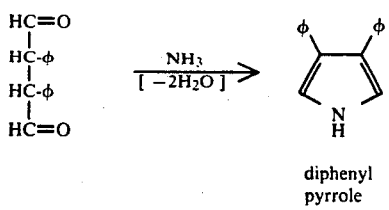

diphenyl pyrrole

Heterocyclic 2-aldehydes containing hetero or oxygen atoms can be prepared from pentosans by hydrolysis to pentoses followed by dehydration and oxidation. For example,

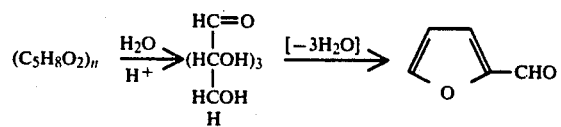

Heterocyclics containing sulfur or nitrogen hetero atoms can be converted into 2-aldehydes by reacting with HCl and HCN, followed by hydrolyzing with water. Two examples follow:

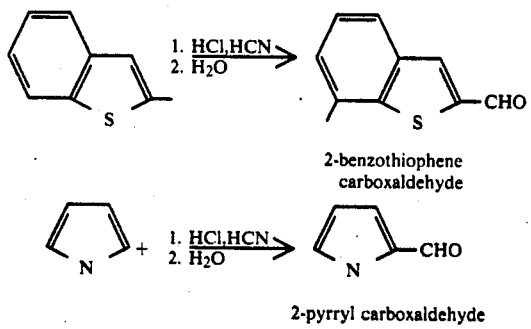

2-benzothiophene carboxaldehyde 2-pyrryl carboxaldehyde

In the foregoing equations, each quadridentate porphine macromolecule is comprised of 4 identical quarters. For example, reacting pyrrole

with 4-pyridine carboxaldehyde forms compound I which is $\alpha,\beta,\gamma,\delta$-tetrakis(4-pyridyl)porphine. Reacting a substituted pyrrole, isoindole

with 4-pyridine carboxaldehyde, forms in an analogous manner the compound tetra benzo-$\alpha,\beta,\gamma,\delta$-tetrakis(4-pyridyl) porphine. Reacting a mixture of pyrrole and indole with 4-pyridine carboxaldehyde forms the monobenzo, dibenzo, or tribenzo derivatives of $\alpha,\beta,\gamma,\delta$-tetrakis(4-pyridyl) porphine, depending upon the proportions of reactants used. This technique of reacting mixtures is widely appliable to the reactions illustrated hereinbefore.

It is also possible to prepare porphines having 4 non-identical quarters by combining reactions of the type illustrated by equations I-X with those illustrated by equations XI-XV. For example, o-acylnaphthonitrile, pyrrole, and an aldehyde react in such a way as to form porphines with 1 to 3 naphtho groups.

Sulfonation of the substituted porphines described hereinbefore can be accomplished by ordinary methods such as are familar to the skilled chemist. Sulfuric acid, oleum, chlorosulfonic acid and the like are effective sulfonating agents. As usual, higher degrees of sulfonation are obtained by increasing reaction time or temperature or by selection of a stronger sulfonating agent.

Sulfonation occurs principally on benzo, naphtho, or other aromatic groups fused directly onto the pyrrole rings or on aromatic groups such as phenyl or naphthyl substituted on the pyrrole rings; and also on phenyl, naphthyl, or other aromatic groups in the meso position. Sulfonation can also occur on pyrido, pyrryl and furan heterocyclic groups, and on aromatic rings fused onto hetero rings; however the pyridine/$SO_3$ salt is often used for these sulfonations.

Often a maximum of 4 locations is possible for each of these two types of substitution, making an overall maximum of 8 sites per molecule readily available for sulfonation. For example, tetrabenzo-meso-tetraphenyl porphine can be reacted to form mono-, di-, tri-, . . . penta-, and octa-sulfonate derivatives. However a photoactivator such as 1,2,3,4,5,6,7,8 octaphenyl-meso-tetraphenyl porphine can possibly have up to 12 sites of sulfonation. Tetra benzo porphine and meso tetra phenyl porphine, each of which has only 4 aromatic substituent groups, are examples of porphines which can be effectively reacted only to form mono-, di-, tri-, and tetra-sulfonate derivatives. Attempting to go beyond this degree of sulfonation destabilizes the molecule.

The foregoing description concerns compositions containing only surfactant and photoactivator, which are the essential elements of this invention. They are unbuilt compositions. Other components are optional, as the photoactivators of this invention are useful in a great variety of otherwise conventional compositions.

For instance, conventional alkaline detergent builders, inorganic or organic, can be used at levels up to about 80% by weight of the composition, i.e. from 0 to about 80%. For built compositions, levels from about 10% to about 60% are preferred, and levels from about 20% to about 40% are especially preferred. The weight ratio of surfactant to total builder in built compositions can be from about 5:1 to about 1:5, preferably from about 2:1 to about 1:2.

Examples of suitable inorganic alkaline detergency builder salts useful in this invention are water soluble alkali metal carbonates, borates, phosphates, polyphosphates, bicarbonates and silicates. Specific examples of such salts are sodium and potassium tetraborates, perborates, bicarbonates, carbonates, tripolyphosphates, pyrophosphates, orthophosphates, and hexametaphosphates.

Examples of suitable organic alkaline detergency builder salts are: (1) Water-soluble aminopolycarboxylates, e.g. sodium and potassium ethylenediaminetetraacetates, nitrilotriacetates and N-(2-hydroxyethyl)-nitrilodiacetates; (2) Water-soluble salts of phytic acid, e.g., sodium and potassium phytates—see U.S. Pat. No. 2,739,942; (3) Water-soluble polyphosphonates, including specifically, sodium, potassium and lithium salts of ethane-1-hydroxy-1,1-diphosphonic acid; sodium, potassium and lithium salts of methylene diphosphonic acid; sodium, potassium and lithium salts of ethylene diphosphonic acid; and sodium, potassium and lithium salts of ethane-1,1,2-triphosphonic acid. Other examples include the alkali metal salts of ethane-2-carboxy-1,1-diphosphonic acid, hydroxymethanediphosphonic acid, carbonyldiphosphonic acid, ethane-1-hydroxy-1,1,2-triphosphonic acid, ethane-2-hydroxy-1,1,2-triphosphonic acid, propane-1,1,3,3-tetraphosphonic acid, propane-1,1,2,3-tetraphosphonic acid, and propane-1,2,2,3-tetraphosphonic acid; (4) Water-soluble salts of polycarboxylate polymers and copolymers as described in U.S. Pat. No. 3,308,067.

A useful detergent builder which may be employed in the present invention comprises a water-soluble salt of a polymeric aliphatic polycarboxylic acid having the following structural relationships as to the position of the carboxylate groups and possessing the following prescribed physical characteristics: (a) a minimum molecular weight of about 350 calculated as to the acid form; (b) an equivalent weight of about 50 to about 80 calculated as to acid form; (c) at least 45 mole percent of the monomeric species having at least two carboxyl radicals separated from each other by not more than two carbon atoms; (d) the site of attachment of the polymer chain of any carboxyl-containing radical being separated by not more than three carbon atoms along the polymer chain from the site of attachment of the next carboxyl-containing radical. Specific examples of the above-described builders include polymers of itaconic acid, aconitic acid, maleic acid, mesaconic acid, fumaric acid, methylene malonic acid and citraconic acid and copolymers with themselves.

In addition, other polycarboxylate builders which can be used satisfactorily include water-soluble salts of mellitic acid, citric acid, pyromellitic acid, benzene pentacarboxylic acid, oxydiacetic acid, carboxymethyloxy-succinic acid and oxydisuccinic acid.

Certain zeolites or aluminosilicates enchance the function of the alkaline metal pyrophosphate and add building capacity in that the aluminosilicates sequester calcium hardness. One such aluminosilicate which is useful in the compositions of the invention is an amorphous water-insoluble hydrated compound of the formula $Na_x(xAlO_2.SiO_2)$, wherein x is a number from 1.0 to 1.2 and y is 1, said amorphous material being further characterized by a $Mg^{++}$ exchange capacity of from about 50 mg eq. $CaCO_3/g$. to about 150 mg eq. $CaCO_3/g$. and a particle diameter of from about 0.01 microns to about 5 microns. This ion exchange builder is more fully described in British Pat. No. 1,470,250 invented by B. H. Gedge et al, published Apr. 14, 1977, herein incorporated by reference.

A second water-insoluble synthetic aluminosilicate ion exchange material useful herein is crystalline in nature and has the formula $Na_z[AlO_2)_z.(SiO_2)]xH_2O$, wherein z and y are integers of at least 6; the molar ratio of z to y is in the range from 1.0 to about 0.5, and x is an integer from about 15 to about 264; said aluminosilicate ion exchange material having a particle size diameter from about 0.1 micron to about 100 microns; a calcium ion exchange capacity on an anhydrous basis of at least about 200 milligrams equivalent of $CaCO_3$ hardness per gram; and a calcium ion exchange rate on an anhydrous basis of at least about 2 grains/gallon/minute/gram. These synthetic aluminosilicates are more fully described in British Pat. No. 1,429,143 invented by Corkill et al, published Mar. 24, 1976, herein incorporated by reference.

For nominally unbuilt compositions, it is contemplated that compositions can contain minor amounts, i.e. up to about 10%, of compounds that, while commonly classified as detergent builders, are used primarily for purposes other than reducing free hardness ions; for example electrolytes used to buffer pH, add ionic strength, control viscosity, prevent gelling, etc.

It is to be understood that the detergent bleach compositions of the present invention can contain other components commonly used in detergent compositions. Soil suspending agents such as water-soluble salts of carboxymethylcellulose, carboxyhydroxymethylcellulose, copolymers of maleic anhydride and vinyl ethers, and polyethylene glycols having a molecular weight of about 400 to 10,000 are common components of the detergent compositions of the present invention and can be used at levels of about 0.5% to about 10% by weight. Dyes, pigments, optical brighteners, and perfumes can be added in varying amounts as desired.

Other materials such as fluorescers, antiseptics, germicides, enzymes in minor amounts, and anti-caking agents such as sodium sulfosuccinate and sodium benzoate may also be added. Other materials useful in detergent compositions are clay, especially the smectite clays disclosed in U.S. Pat. No. 3,915,882, suds boosters, suds depressants, fillers such as sodium sulfate, pH buffers, and hydrotropes such as sodium toluene sulfonate and urea.

Peroxygen bleaches such as sodium perborate can optionally be used in the compositions of this invention. In conjunction therewith, conventional chemical activators can be used to bleach more effectively at low temperatures, such as the anhydrides, esters and amides disclosed by Gilbert in Detergent Age, June 1967 pages 18–20, July 1967 pages 30–33, and August 1967 pages 26–27 and 67. It is generally believed that these activators function by means of a chemical reaction that requires usage in approximately a 1:1 mol ratio with the peroxygen compound. Catalytic photoactivators for peroxy bleaches can also be used, such as the iron porphines, haemin chlorides and iron phthalocyanines disclosed in copending commonly assigned patent application serial no. U.S. Ser. No. 697,006 filed June 17, 1976.

It should be understood that, as described in detail hereinbefore, the instant photoactivators do not function by activating perborate or other peroxygen compounds; the mechanism by which the instant photoactivators accomplish their purpose is by activating oxygen. Nevertheless, formulations are not precluded that contain components which bleach by two different mechanisms operating independently.

Granular formulations embodying the compositions of the present invention may be formed by any of the conventional techniques i.e., by slurrying the individual components in water and then atomizing and spray-drying the resultant mixture, or by pan or drum granulation of the components. A preferred method of spray drying compositions in granule form is disclosed in U.S. Pat.

Nos. 3,629,951 and 3,629,955 issued to Davis et al on Dec. 28, 1971.

Liquid detergents embodying the photoactivating compositions of the present invention can contain builders or can be unbuilt. If unbuilt, they can contain about 10 to about 50% surfactant, from 1 to about 15% of an organic base such as mono-, di-, or tri-alkanolamine, and a solubilization system containing various mixtures of water, lower alcohols and glycols, and hydrotropes. Built liquid single-phase compositions can contain about 10 to about 25% surfactant, from about 10 to about 20% builder which can be inorganic or organic, about 3 to about 10% hydrotrope, and water. Built liquid compositions in multi-phase heterogeneous form can contain comparable amounts of surfactant and builder together with viscosity modifiers and stabilizers to maintain stable emulsions or suspensions.

Compositions of this invention in the form of detergent laundry bars can be prepared as described in U.S. Pat. No. 3,178,370 issued Apr. 13, 1965 and British Patent No. 1,064,414 issued Apr. 5, 1967, both to Okenfuss and both herein incorporated by reference. A preferred process, called "dry neutralization", involved spraying the surfactant in liquid, acid form upon an agitated mixture of alkaline components such as phosphates and carbonates, followed by mechanically working as by milling, extruding as in a plodder, and forming into bars.

The detergent bleach composition of this invention can also be incorporated if desired into substrate articles. These articles consist of a water-insoluble substrate which releasably incorporates an effective amount, preferably from about 3 to about 120 grams, of the detergent composition described herein, plus an effective amount of photoactivating bleach as described herein.

Detergent bleach formulations embodying the compositions of the present invention are commonly used in laundry practice at concentrations from about 0.1 to about 0.6 wt.% in water. Within these approximate ranges are variations in typical usage from household to household and from country to country, depending on washing conditions such as the ratio of fabric to water, degree of soiling of the fabrics, temperature and hardness of the water, method of washing whether by hand or by machine, specific formulation employed, etc.

It has been stated hereinbefore that photoactivator usage is from about 0.005% to about 0.5% by weight based on the detergent bleach composition, preferably from about 0.01% to about 0.1%. Combining those figures with the foregoing detergent bleach concentrations in water yields the result that photoactivator concentrations in water range from about 0.05 parts per million (ppm) to about 30 ppm. Within this range, from about 0.25 to about 5 ppm. are preferred. The lower side of the foregoing ranges are especially effective when the laundry process involves exposing fabric to photoactivator for a relatively long time, as for example during a 30 to 120-minute presoak followed by a 20 to 30-minute wash, and drying the fabric in brilliant sunlight. The higher side of the foregoing ranges are needed when the laundry process involves exposing fabric to photoactivator for a relatively short time, as for example during a short 10-minute wash followed by drying in an illuminated dryer, on a line indoors, or outdoors on a cloudy day. While exposure to oxygen and visible light are essential, the source, intensity and duration of exposure of the light affect merely the degree of bleaching achieved.

In general, laundry practice embodying the present invention in its processing aspect comprises removing stains from cottom textiles by treating the textiles, in the presence of visible light and oxygen, with an aqueous solution of a composition of this invention. More particularly, the process comprises the following steps: (i) washing fabrics with a detergent bleach composition, (ii) rinsing the fabrics, (iii) drying the fabrics, and (iv) providing exposure to visible light and oxygen during any of steps (i), (ii) or (iii). These steps are appropriate whatever physical form detergent bleach may be employed (e.g. granule, liquid, bar, substrate) and whatever means of exposure to light and oxygen are employed (e.g. outdoor washing, outdoor drying, illuminated washing machine, illuminated dryer).

EXAMPLE I

Tetrabenzo triaza porphine was prepared as follows: A solution of methyl magnesium iodide was prepared from 2.4 gm. of magnesium and 6.5 ml. of methyl iodide in 100 ml. of ether; this was decanted from the residual metal and added to a mixture of 12.8 gm. of finely powdered phthalonitrile and 50 ml. of ether. Upon addition, the liquid at once turned reddish-brown, the nitrile dissolving, the ether gently boiling, and a tarry mass forming. After three hours at room temperature, the remainder of the ether was removed on a steam bath and the tarry residue was rapidly heated to 200° C. Three ml. of $H_2O$ were added dropwise, liberating first white fumes and then iodine vapor. After a further ½ hour at 200° C., the powdery residue was cooled, crushed and repeatedly extracted with a mixture of alcohol and 10% concentrated hydrochloric acid until the extract was no longer brown in color. The residue was then washed with 500 ml. of absolute ethanol and dried in an oven at 105° C. for one hour. The product was freed from magnesium by dissolving it in concentrated sulfuric acid (150 ml.), followed by filtration and precipitation of the pigment with ice. The green precipitate was then collected on a filter and was washed with hot water containing 5% ammonium hydroxide. It was then dried at 105° C. and crystallized from chloronaphthalene. Yield was 4.2 gm. of tetra-benzo triaza porphine in the form of purple needle-like crystals.

Elemental analysis of the product yielded the following results:

|  | % C | % H | % N |
|---|---|---|---|
| $C_{33}H_{19}N_7$ requires: | 77.2 | 3.7 | 19.1 |
| found: | 77.3 | 3.6 | 19.3 |

A quantitative examination of the spectrum of the pigment in chloronaphthalene, using a Cary 14 spectrometer, gave the following results:

| Wave length | $\lambda$ (nm.) | 694 | 652 | 638 | 622 | 592 | 570 |
|---|---|---|---|---|---|---|---|
| Extinction coef. | log. $\epsilon$ | 5.19 | 5.03 | 4.75 | 4.66 | 4.43 | 4.03 |

The foregoing method of preparation is similar to that described in Barrett et al, J. Chem. Society, pages 1809–1820, and the spectrum reported above is identical to that found by Barrett.

Tetrabenzo triaza porphine was metallated to tetrabenzo triaza porphine zinc by the following process: 200 ml. of reagent grade N,N' dimethylformamide was brought to reflux in a 2 l. flask on a stirring hot plate. Tetrabenzo triaza porphine (2 gm.) was then added, 1 minute allowed for complete solution to occur, and then a 10% excess of the stoichiometric amount of zinc acetate was added (0.86 gm.) and reaction was allowed to proceed under reflux for one hour. The reaction vessel was then removed from the hot plate and cooled in an ice-water bath for 15 minutes. 200 ml. of chilled distilled water was then added, and the resulting partially crystalline precipitate was filtered, washed with water, and air-dried. The product was then recrystallized from chloronaphthalene. Yield was 1.9 gm. in the form of purplish crystals. Elemental analysis yielded the following results:

|  | % C | % H | % N |
|---|---|---|---|
| $C_{33}H_1-N-Zn$ requires: | 68.8 | 2.95 | 11.4 |
| found: | 69.2 | 3.10 | 11.1 |

A quantitative examination of the spectrum of tetrabenzo triaza porphine zinc in chloronaphthalene, using a Cary 14 spectrometer, gave the following results.

| $\lambda$ (nm): | 677 | 654 | 625 | 614 | 599 |
|---|---|---|---|---|---|
| log $\epsilon$ | 5.24 | 5.05 | 4.42 | 4.43 | 4.39 |

These values compare very well with the results of Barrett et al, op. cit.

Sulfonation of tetrabenzo triaza porphine zinc led to the compound tetrasulfobenzo triaza porphine, tetrasodium salt, with demetallation occurring simultaneously: One gram of tetrabenzo triaza porphine zinc and 20 ml. of concentrated $H_2SO_4$ were ground into a homogeneous paste with a mortar and pestle. The paste was then transferred to a 250 ml. beaker and 50 additional ml. of concentrated $H_2SO_4$ were admixed. The mixture was then heated on a steam bath for 4 hours, removed and allowed to stand at room temperature for 48 hours, and filtered to remove unreacted pigment. The filtrate was then diluted with two volumes of $H_2O$ to precipitate the bright green $HSO_4^-$ salt of the sulfonated material, which was filtered and washed with acetone and then dissolved in alkaline methanol (5% NaOH in $CH_3OH$). The sulfonated porphine was then precipitated as the sodium salt by addition of 3 volumes of acetone. After the product was then dried, it was extracted with hot methanol to remove $Na_2SO_4$ residues. After extraction, the porphine was dissolved in $H_2O$, acidified to pH 3, and passed through the H+ form of the cation exchange resin Dowex 50W-X8 (50-100 mesh) to remove ionic zinc. Pure tetrasulfobenzo triaza porphine in the form of a fine green powder was then isolated from a pH 5 solution by the addition of four volumes of acetone.

Elemental analysis yielded the following results:

|  | % C | % H | % N | % S |
|---|---|---|---|---|
| $C_{33}H_1_5N_8S_4O_{12}Na_4$ requires: | 42.99 | 1.63 | 10.64 | 13.91 |
| found | 43.2 | 1.69 | 10.68 | 13.76 |

The absence of zinc was verified by atomic absorption spectroscopy. Tetrasulfonation was confirmed by the chromatographic techniques described in Japanese patent application laid open to the public as OPI 50-113,479 on Sept. 5, 1975 which corresponds to U.S. Ser. No. 419,320 filed Nov. 27, 1973.

Examination of the spectrum of tetrasulfobenzo triaza porphine, tetrasodium salt, in $H_2O$ at pH 9.5, using a Cary 14 spectrometer, yielded the following results:

| $\lambda$ (nm): | 694 | 666 | 645 | 634 | 618 | 589 |
|---|---|---|---|---|---|---|
| log $\epsilon$: | 4.56 | 5.15 | 4.92 | 4.63 | 4.24 | 3.71 |

Tetrasulfobenzo triaza porphine, tetrasodium salt, was evaluated as a photoactive bleach in conjunction with a granular detergent having the following composition identified herein as Composition [E] which has a pH at use concentration in water of about 10.2.

| Component | Wt. % Composition [E] |
|---|---|
| $C_{12}$ branched chain alkyl benzene sulfonate | 20 |
| Sodium tripolyphosphate | 28 |
| Sodium toluene sulfonate | 2 |
| Silicate solids (2.0 ratio $SiO_2/Na_2O$) | 5.4 |
| Sodium sulfate | 34 |
| Sodium carbonate | 0.17 |
| Sodium carboxymethyl cellulose | 0.45 |
| Perfume | 0.1 |
| Optical brightener | [none] |
| Miscellaneous | 1.38 |
| Moisture | 8.5 |
| Total detergent | 100.00 |

Tergotometer tests were run as follows: to each 1-gal. tub was added 1000 ml. of water having a hardness of 7 grains/gallon with a Ca/Mg ratio of 3/1, and 2.5 gm. of detergent composition [E] defined above; the concentration of detergent in the solution was accordingly 0.25%. Photoactivator was added to certain of the solutions, as described in Table I. The cloth load in each tub was 5.3 gm. in weight and consisted of six cotton swatches 2½×2½ inches in size, 3 of which had been previously stained with tea and 3 with wine. [Staining had been accomplished by passing cotton muslin through a boiled tea or wine bath, respectively, followed by squeegeeing, drying and aging.] The swatches were washed in the Tergotometer for 10 minutes at 70° F. with a rotor speed of 110 rpm.; were rinsed by hand for 1 minute at 70° F. in a beaker containing 500 ml. of water having the same hardness as that used for washing, and were line-dried outdoors in the sun for 1 hour. After drying, the swatches were read on a Gardner XL-10 Color Difference Meter and the resultant L, a and b values were calculated into whiteness according to the formula $$W = 100 - \sqrt{(100 - L)^2 + a^2 + b^2}$$

These values of whiteness were compared with those of stained swatches before the Tergotometer treatment to obtain $\Delta W$ values which measure the extent of bleaching accomplished by the photoactivators. Results are given in Table I, and are discussed hereinafter.

EXAMPLE II

Tetra(4-sulfophenyl)porphine, tetraammonium salt was prepared as follows: Two grams of tetraphenyl porphine, obtained from the Aldrich Chemical Company, Milwaukee, Wis., U.S.A., was sulfonated in the manner described in Example I for tetrabenzo triaza porphine with the exception that neutralization was done with methanolic ammonia (5%). Yield was 2.5 mg. of tetra(4-sulfophenyl)porphine tetraammonium salt. Confirmation that the porphine was tetrasulfonated was obtained through the chromatographic technique described above. Confirmation that the sulfonations took place in the 4 position was done by nuclear magnetic resonance (nmr): the nmr spectrum of the sulfonated compound in $D_2O$ shows an absorption due to the pyrrole protons at $\tau=2.19$ referred to a 3(trimethilsylyl)-propane sulfonic acid reference, and two doublets due to the phenyl protons centered at $\tau=2.79$ and 1.81 with a coupling between them of 8 cps. The integrated area of the phenyl protons to pyrrole protons gave the expected 2:1 ratio.

Further confirmation of the purity of the material was done by spectral analysis on a Cary 14 spectrometer:

| λ (nm) | 411 | 515 | 552 | 580 | 633 |
|---|---|---|---|---|---|
| Log ε | 4.72 | 3.21 | 2.82 | 2.79 | 2.57 |

The foregoing method of preparation is similar to that described in Fleisher, J. Amer. Chem. Soc., 93, 3162 (1971), and the spectrum reported above agrees very well with that found by Fleisher.

Metallation was accomplished in a manner similar to that described in Example I. One gram of tetra(4-sulfophenyl)porphine, tetraammonium salt was reacted with a 10% excess of zinc acetate in refluxing dimethyl formamide for one hour. However isolation of the product was accomplished by a different procedure. After completion of the reaction, the solvent was removed on a rotavaporator to obtain a residue. This residue was dissolved in water, acidified to pH 3, and passed through the H+ form of the cation exchange resin Dowex 50W-X8 (50–100 mesh) to remove the excess ionic zinc. As the solution passed through the resin, it was immediately neutralized with sodium hydroxide to avoid decomposition of the acidic compound to zinc ions and the unmetallated porphine sulfonate. Yield was 0.96 g. tetra(4-sulfophenyl) porphine zinc, tetrasodium salt.

Spectral analysis yielded the following results:

| λ (nm) | 517 | 557 | 595 | 630 |
|---|---|---|---|---|
| Log ε | 2.88 | 3.28 | 2.84 | 1.81 |

Analysis of the zinc content by atomic absorption yielded 6.47% zinc vs. 6.50% theoretical on the basis of the empirical formula $C_{44}H_{28}N_4S_4O_{14}ZnNa_4$ which includes 2 moles of water of hydration.

Tergotometer tests made as described in Example I were run on both tetra(4-sulfophenyl)porphine, tetraammonium salt and its metallated derivative tetra(4-sulfophenyl)prophine zinc, tetrasodium salt. Results are given in Table I, and are discussed hereinafter.

The unmetallated compound mentioned in the preceding paragraph was also the subject of other tests, the results of which are given in Tables II and III and are discussed hereinafter, and the procedures for which are described as follows.

The test reported in Table II involved photoactivator used together with unbuilt detergent compositions in liquid form. The ingredients for these compositions are:

| Component | Wt. % Composition [F] |
|---|---|
| $C_{14-15}$ alkyl polyethoxy ether having an average of 7 mols of ethylene oxide per mol of alcohol | 33 |
| Sodium $C_{12}$ alkyl benzene sulfonate | 22 |
| Oleic acid | 1.0 |
| Triethanol amine | 5.5 |
| Ethanol | 4.7 |
| Electrolyte (0.9 KOH; 0.1 citric acid) | 1.0 |
| Perfume, color and brightener | 0.7 |
| Water and Miscellaneous | 32.1 |
| | 100.0 |
| pH at use conc. in $H_2O$ | ~8.5 |

| Component | Wt. % Composition [G] |
|---|---|
| Ammonium salt of coconut alkyl polyethoxy ether sulfate having an average of 3 mols of ethylene oxide per mol of alcohol | 25 |
| Sodium salt of $C_{14-16}$ alkyl polyethoxy ether sulfate having an average of 2 mols of ethylene oxide per mol of alcohol | 5 |
| Sodium salt of coconut alkyl glyceryl ether sulfonate | 4 |
| Potassium toluene sulfonate | 0.5 |
| Ethanol | 6.9 |
| Electrolytes (2.5 KCl; 0.5 $H_3PO_4$; 0.5 potassium toluene sulfonate; 0.1 citric acid) | 3.6 |
| Citric acid, perfume and opacifier | 1.2 |
| Ethylene glycol distearate | 1.0 |
| Water and miscellaneous | 52.8 |
| | 100.0 |
| pH at use conc. in $H_2O$ | ~7.0 |

Tergotometer tests were run in a manner which involved a soaking process followed by a washing process, as follows: to each 1-gal. tub was added 1000 ml. of water having a hardness of 9 grains/gallon with a Ca/Mg ratio of 3/1 and 3.6 gm. of detergent composition ([F] or [G]) defined above; the concentration of detergent in the solution was accordingly 0.36%. Photoactivator was added to certain of the solutions, as described in Table II. The cloth load in each tub consisted of 2½-inch square swatches, 2 of which were cotton muslin previously stained with tea in the manner hereinbefore described, plus 8 clean terry cloth swatches to make a total cloth load of 9.9 grams. All swatches were soaked for 1½ hours at 70° F., following which 4 terry swatches were removed after the soaking solution clinging thereto had been squeezed back into the tubs. The remaining swatches were washed for 10 minutes at 110 rpm. and rinsed by hand under the tap (city water, about 6 gr./gal.). After line-drying in the sun for 1 hour, the stained, soaked and washed swatches were read on the Gardner XL-10 as before. Values of W were obtained as compared with the W for stained swatches read prior to the soaking, washing and sun drying treatment. Differential values ΔW which are given in Table II measure the extent of bleaching which was accomplished by the photoactivator.

Other soaking/washing Tergotometer tests were run in the manner described in the preceding paragraphs with certain important changes: The detergent used was composition [E] as hereinbefore defined. Detergent concentration in solution was 0.6% and photoactivator concentration in solution was 0.3 ppm. In addition to the tea stained and white terry swatches previously described were 8 similarly sized swatches cut from a bolt of yellow fabric purchased in Mexico. After soaking, washing, and sun drying as hereinbefore described, it was found that, as compared to the control composition, the composition containing photoactivator not only bleached the tea stains but also bleached the yellow dye that had bled from the yellow fabric and had deposited upon the originally white terry swatches. This effect was measured by the Gardner b value which is a measure of yellowness. These results are given in Table III and described thereafter.

No change in the appearance of the yellow fabrics themselves was observed to be caused by the photoactivator.

Comparable tests were also run, the swatches of which were dried in a dark room instead of in sunlight. No bleaching took place in the absence of light, and the fabrics treated with photoactivator solution were in fact pale blue/green in color due to the intrinsic blue/green color of the photoactivator compound. This color disappeared upon later exposure of the fabrics to light.

Other comparable tests were run using the yellow Mexican fabrics in solutions of detergent compositions [F] and [G] with and without photoactivator. As with composition [E], the photoactivator both bleached the tea stains and reduced transfer of yellow dye to the originally white terry fabrics.

TABLE I

BLEACHING/STAIN REMOVAL (ΔW)
Built Detergent Composition [E]0.25%

| Type of Photoactivator | Type of Stain | | | |
|---|---|---|---|---|
| | Wine | | Tea | |
| | Conc. of Photoactivator (ppm.) | | | |
| | 1 | 10 | 1 | 10 |
| None | 8.6 | 8.6 | 7.7 | 7.7 |
| Tetrasulfobenzo tetraaza porphine zinc, tetrasodium salt | 11.2 | 12.1 | 8.2 | 9.8 |
| Tetrasulfobenzo triaza porphine, tetrasodium salt | 11.3 | 11.3 | 7.9 | 9.3 |
| Tetra (4-sulfophenyl) porphine, tetraammonium salt | 10.9 | 12.5 | 8.4 | 9.5 |
| Tetra(4-sulfophenyl) porphine zinc, tetrasodium salt | 10.5 | 10.4 | 7.9 | 6.8 |

[90% LSD = 0.4]

Table I presents bleaching, i.e. stain removal, data for aqueous solutions of a built detergent composition described hereinbefore containing four different photoactivators and a control, respectively. All numbers appearing in the table represent the average of duplicate tests. Whiteness improvement during treatment is presented for two concentrations, each, for wine stains and for tea stains.

The first composition contained no photoactivator and was the control composition for reference purposes.

The second composition contained the photoactivator disclosed by Holcombe and Shultz in Japanese patent application OPI No. 50-113,479 (U.S. Ser. No. 419,320) referred to hereinbefore.

The third, fourth, and fifth compositions are compositions according to this invention. It is apparent that with the exception of but one test condition the fabrics washed in compositions containing photoactivators of this invention are more white than those washed in comparable compositions with no photoactivator, and in most cases the differences are statistically significant.

For all tests reported herein, reference to photoactivator usage in on a 100% active basis as determined chromatographically.

TABLE II

BLEACHING/STAIN REMOVAL (ΔW)
Unbuilt Detergent Compositions 0.36%
Tea Stains
Photoactivator Conc. 3.5 ppm.

| Type of Photoactivator | Composition F | Composition G |
|---|---|---|
| None | 2.4 | 4.7 |
| Tetra(4-sulfophenyl) porphine, tetraammonium salt | 3.7 | 7.6 |

[90% LSD = 1.3]

Table II presents bleaching, i.e. stain removal, data for two liquid compositions described hereinbefore, each containing a photoactivator of this invention, in comparison with a control. It is apparent that in both of these unbuilt detergents the composition containing photoactivator exhibits significant bleaching effects.

TABLE III

BLEACHING/STAIN REMOVAL (ΔW)
and
DYE TRANSFER REMOVAL (Δb)
Built Detergent Composition [E] 0.6%
Photoactivator Conc. 0.3 ppm.

| Type of swatch Test purpose | Tea-stained muslin Bleaching/ Stain Removal | White terry Dye Transfer Removal |
|---|---|---|
| Type of photoactivator | | |
| None | ΔW = 6.6 | b = 1.73 |
| Tetra (4-sulfophenyl) porphine, tetraammonium salt | ΔW = 7.7 | b = 0.20 |
| [90% LSD] | [0.6] | [0.7] |

Table III presents, for a built detergent composition described hereinbefore, data for both bleaching and dye transfer removal brought about by a photoactivator of this invention in comparison with a control. It is apparent that the photoactivator is significantly effective in both respects.

EXAMPLE III

Detergent bleach compositions of this invention are prepared as described in Table IV which follows. Compositions 12, 15 and 16 are in liquid form while the remainder are in granular form. When tested for bleaching in the manner described in Example I they are effective. All figures in the table are weight percent of the compositions, and identification of the components specified in the table appears thereafter. For all compositions the balance not specified is comprised of sodium sulfate.

Compositions 17, 18 and 19 are prepared like compositions 2, 6 and 13, respectively, except that the porphine derivatives are metallated with aluminum instead of zinc. Compositions 20, 21 and 22 are similarly prepared except they are metallated with calcium. When tested for bleaching in the manner described in Example I they are effective.

TABLE IV

| Composition No. | Photo-activator | | Surfactant | | Builder | | Moisture | Other Components | |
|---|---|---|---|---|---|---|---|---|---|
| 1 | 0.20% | pa | 10% | sa | 44% | ba | 14% | 1% | oa |
| | | | | | | | | 0.2 | ob |
| | | | | | | | | 2 | oc |
| 2 | 0.015 | pb | 15 | sb | 8 | bb | 10 | 0.5 | oa |
| | | | | | 2 | bg | | 0.1 | ob |
| | | | | | 15 | bh | | 1 | od |
| 3 | 0.005 | pc | 15 | sc | 20 | bb | 5 | 0.1 | ob |
| | | | 5 | sm | 10 | bf | | 0.5 | oe |
| | | | | | 10 | bl | | | |
| 4 | 0.25 | pd | 20 | sa | 22 | bc | 6 | 0.2 | of |
| | | | 10 | sd | 8 | bg | | | |
| 5 | 0.25 | pa | 30 | se | 10 | bb | 8 | 0.1 | ob |
| | 0.25 | pe | 10 | sk | 10 | bi | | | |
| 6 | 0.010 | pf | 40 | sb | 10 | bm | 2 | 0.5 | oa |
| | | | 10 | sl | | | | | |
| 7 | 0.40 | pg | 12 | sf | 40 | ba | 10 | 1 | oc |
| | | | 3 | sn | 10 | bj | | | |
| | | | | | 10 | bn | | | |
| 8 | 0.025 | ph | 15 | sa | 15 | ba | 4 | 0.1 | of |
| | | | 10 | sg | 15 | be | | 0.5 | oh |
| | | | | | 5 | bg | | 10 | oj |
| 9 | 0.02 | pi | 12 | sh | 50 | ba | 6 | 0.2 | ob |
| | | | | | 10 | bf | | | |
| | | | | | 20 | bk | | | |
| 10 | 0.15 | pj | 2 | sj | 24 | bd | 7 | 10 | oi |
| | | | 26 | sp | 4 | bg | | | |
| 11 | 0.25 | pk | 32 | sc | 0 | | 11 | 1 | oa |
| | | | 8 | si | | | | 1 | oc |
| 12 | 0.05 | pl | 14 | sq | 12 | bn | 61.3 | 0.5 | ob |
| | | | | | | | | 12 | oc |
| | | | | | | | | 0.1 | og |
| 13 | 0.35 | pm | 18 | sc | 0 | | 12 | 0.1 | of |
| | | | 4 | so | | | | | |
| 14 | 0.04 | pn | 30 | se | — | | 10 | 2 | bj |
| | | | | | | | | 0.1 | ob |
| 15 | 0.10 | po | 17 | sq | 0 | | 71.9 | 5 | oc |
| | | | | | | | | 6 | om |
| 16 | 0.20 | pp | 8 | sm | 0 | | 61.4 | 0.3 | ob |
| | | | 15 | sr | | | | 3 | oc |
| | | | | | | | | 0.01 | og |
| | | | | | | | | 10 | ok |
| | | | | | | | | 2 | ol |

Photoactivators pa tetrasulfobenzo triaza porphine, tetrasodium salt
pb tetrasulfobenzo triaza porphine zinc, tetrasodium salt
pc tetra(4-sulfophenyl) porphine, tetraammonium salt
pd tetra(4-sulfophenyl) porphine zinc, tetrasodium salt
pe trisulfobenzo-meso-tetraphenyl porphine, trisodium salt
pf tetrasulfopyrido-meso-tetraphenyl porphine zinc, tetrapotssium salt
pg tetrasulfonaphtho monoaza porphine, tetrasodium salt
ph benzotrisulfobenzo monoaza porphine magnesium, trisodium salt
pi benzotrisulfobenzo diaza porphine, trilithium salt
pj tetrasulfobenzo diaza porphine scandium, tetradiethanolamine salt
pk 1,2,3,4,5,6,7,8-octasulfophenyl porphine, octasodium salt
pl trans-dichloro, trisulfobenzo-tri(sulfo-2-pyridyl)-2-pyridyl porphine tin (IV), hexasodium salt
pm α, β, γ, ∂-tetrakis (2-furyl, 5 sulfo) porphine zinc, tetrasodium salt
pn tetrasulfonaphtho-meso-tetraethyl porphine, tetrapotassium salt
po meso-sulfopyrryl-meso-trisulfopenyl porphine, tetrasodium salt
pp benzo trisulfobenzo porphine, tetrasodium salt

Surfactants sa $C_{12}$ branched chain alkyl benzene sulfonate (ABS), sodium salt
sb $C_{12}$ linear alkyl benzene sulfonate (LAS), sodium salt
sc coconut alkyl sulfate, sodium salt
sd beta-alkoxy alkane sulfonate containing 2 carbon atoms in the alkyl group and 16 carbon atoms in the alkane moiety
se $C_{16}$ paraffin sulfonate, sodium salt
sf $C_{14}$ alpha olefin sulfonate, sodium salt
sg $C_{18}$ alpha sulfocarboxylate, sodium salt
sh ethyl ester of $C_{18}$ alpha sulfocarboxylate, sodium salt
si tallow alkyl glyceryl ether sulfonate, sodium salt
sj tallow soap
sk alkyl polyethoxy alcohol sulfate having 11 carbon atoms in the alkyl group and 2 mols ethylene oxide per mol of alcohol, sodium salt
sl alkyl phenol polyethoxy alcohol sulfate having 9 carbon atoms in the alkyl group and 10 mols ethylene oxide per mol of alkyl phenol, sodium salt
sm alkyl polyethoxy alcohol having 16 carbon atoms in the alkyl group and 25 mols ethylene oxide per mol of alcohol
sn polyethoxy polypropoxy glycol having a molecular weight of 5000, half of which represents the polypropoxy base and half of which represents hydrophilic polyethoxylate
so dimethyl $C_{12}$ amine oxide
sp $C_{16}$ dimethyl ammonio propane sulfonate
sq $C_{12}$ linear alkyl benzene sulfonate (LAS), triethanolamine salt
sr coconut alkyl sulfate, potassium salt

Builders ba sodium tripolyphosphate
bb sodium pyrophosphate
bc sodium nitrilotriacetate
bd citric acid
be sodium carbonate
bf sodium silicate solids, 2.0 ratio $SiO_2/Na_2O$
bg sodium silicate solids, 3.2 ratio $SiO_2/Na_2O$
bh sodium aluminosilicate $Na_{12}(AlO_2 . SiO_2)_{12} . 27 H_2O$
bi potassium tetraborate
bj sodium bicarbonate
bk potassium hexametaphospate
bl sodium orthophosphate
bm ethane-1-hydroxy-1,1-diphosphonate, sodium salt
bn potassium pyrophosphate

Other Components oa polyethylene glycol, molecular weight 6000
ob perfume
oc potassium toluene sulfonate
od sodium sulfosuccinate
oe sodium carboxymethylcellulose
of optical brightener (fluorescer)
og colorant
oh protease
oi montmorrilonite clay
oj sodium perborate
ok ethanol
ol diethylene glycol monoethyl ether
om triethanolamine

What is claimed is:

1. A detergent bleach composition consisting essentially of:

(a) from about 10% to about 50% by weight of the composition of surfactant selected from the group consisting of anionic, nonionic, semi-polar, ampholytic and zwitterionic surfactants;

(b) from about 0.005% to about 0.5% by weight of the composition of a water soluble photoactivator having the formula

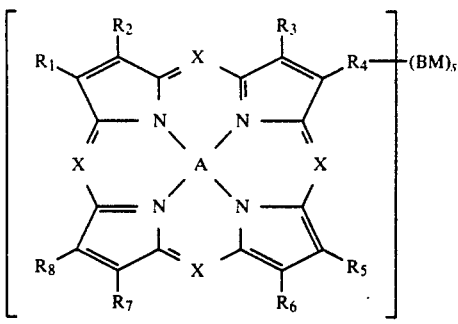

wherein each X is (=N—) or (=CY—), and the total number of (=N—) groups is 0, 1, 2, or 3; wherein each Y, independently, is hydrogen or meso substituted alkyl, cycloalkyl, aralkyl aryl, alkaryl or heteroaryl; wherein each R, independently, is hydrogen or pyrrole substituted alkyl, cycloalkyl, aralkyl aryl, alkaryl or heteroraryl, or wherein adjacent pairs of R's are joined together with ortho-arylene groups to form pyrrole substituted alicyclic or heterocyclic rings; wherein A is 2(H) atoms bonded to diagonally opposite nitrogen atoms, or Zn(II), Ca(II), Cd(II), Mg(II), Sc(III), Al(III), or Sn(IV); where B is a sulfonate group substituted into Y or R; wherein s is an integer from 3 to about 8 inclusive; and wherein M is a cation selected from the group consisting of sodium, potassium, lithium, ammonium, and mono-di- and tri-ethanolamine; provided that the sites of sulfonation are in substituent groups comprised of aromatic or pyrido groups substituted on R or aromatic or heterocyclic groups substituted on Y, the sulfonate groups are attached to carbon atoms no more than 5 atoms displaced from the porphine core, and the number of the sulfonate groups is no greater than the number of said substituent groups;

(c) from 0 to about 80% by weight of the composition of alkaline detergent builder selected from the group consisting of inorganic and organic builders; and (d) balance selected from the group consisting of sodium sulfate, smectite clay, alkanolamine, water, lower alcohols and glycols, and hydrotropes.

2. The composition of claim 1 wherei A is 2(H) or Zn(II).

3. The composition of claim 1 wherein M is ammonium, ethanolamine or alkali metal and s is 3 or 4.

4. The composition of claim 1 wherein the weight percent of the photoactivator in the composition is from about 0.01% to about 0.1%, and the weight ratio of photoactivator to surfactant is between about 1/300 and about 1/60.

5. The composition of claim 1 wherein each R, independently, is hyrogen or pyrrole-substituted benzo naphtho, pyrido, phenyl or naphthyl.

6. The composition of claim 5 wherein each Y is H.

7. The composition of claim 1 wherein each Y, independently, is hydrogen or meso-substituted phenyl naphthyl, thienyl, furyl, thioazyl, oxazolyl, indolyl, benzothienyl, or pyridyl.

8. The composition of claim 7 wherein each R is H.

9. The composition of claim 1 wherein c is an integer from 3 to 6, inclusive.

10. The composition of claim 9 wherein A is 2(H) or Zn(II); M is ammonium ethanolamine or alkali metal; and s is 3 or 4.

11. The composition of claim 1 wherein each R is H and each Y is meso-substituted phenyl or wherein each Y is H and each R is pyrrole-substituted benzo; and wherein the weight ratio of photoactivator to surfactant is from about 1/10,000 to about 1/20.

12. The composition of claim 11 wherein A is 2(H) or Zn(II); M is ammonium ethanolamine or alkali metal; and s is 3 or 4.

13. The composition of claim 12 wherein c is 3 or 4 and wherein the weight percent of the photoactivator in the composition is from about 0.01% to about 0.1%, and the weight ratio of photoactivator to surfactant is between about 1/1000 and about 1/100.

14. The composition of claim 11 wherein the surfactant is selected from the group consisting of water soluble salts of alkyl benzene sulfonate, alkyl sulfate, alkyl polyethoxy ether sulfate, paraffin sulfonate, alpha-olefin sulfonate, alpha-sulfocarboxylates and their esters, alkyl glyceryl ether sulfonate, fatty acid monoglyceride sulfates and sulfonates, alkyl phenol polyethoxy ether sulfate, 2-acyloxy-alkane-1-sulfonate, beta-alkyloxy alkane sulfonate, soap; water soluble compounds produced by the condensation of ethylene oxide with an alcohol, alkyl phenol, polyproxy glycol or polyproxy ethylene diamine; water soluble amine oxides, phosphine oxides, and sulfoxides; water soluble derivatives of aliphatic secondary and tertiary amines; and water soluble derivatives of aliphatic quaternary ammonium, phosphonium, and sulfonium cationic compounds.

15. The composition of claim 14 wherein the surfactant is from about 15% to about 30% by weight of the composition and contains from about 10% to about 60% of an alkaline detergent builder selected from the group consisting of water soluble alkali metal carbonates, borates, phosphates, polyphosphates, bicarbonates and silicates; water soluble aminopolycarboxylates, phytates, polyphosphonates, and polycarboxylates; and aluminosilicates selected from the group consisting of amorphous water-insoluble hydrated compounds of the formula $Na_x(xAlO_2 \cdot SiO_2)$, wherein x is a number from 1.0 to 1.2 and y is 1, said amorphous material being further characterized by a $Mg^{++}$ exchange capacity of from about 50 mg eq. $CaCO_3$/g. to about 150 mg eq. $CaCO_3$/g. and a particle diameter of from about 0.01 microns to about 5 microns; and crystalline water insoluble hydrated compounds of the formula $Na_z[AlO_2)_z\cdot(SiO_2)]xH_2O$, wherein z and y are integers of at least 6, the molar ratio of z to y is in the range from 1.0 to about 0.5, and x is an integer from about 15 to about 264, said crystalline aluminosilicate ion exchange material having a particle size diameter from about 0.1 micron to about 100 microns, a calcium ion exchange capacity on a anhydrous basis of at least about 200 milligrams equivalent of $CaCO_3$ hardness per gram, and a calcium ion exchange rate on an anhydrous basis of at least about 2 grains/gallon/minute/gram.

16. The composition of claim 15 wherein M is sodium and s is 3 to 4.

17. A process for removing stains from cotton textiles which comprises treating the textiles, in the presence of visible light and oxygen, with an aqueous solution of the detergent bleach composition of claim 11.

18. A process for removing stains from cotton textiles which comprises treating the textiles, in the presence of visible light and oxygen, with an aqueous solution of the detergent bleach composition of claim 1.

19. A process for removing stains from cotton textiles which comprises treating the textiles, in the presence of visible light and oxygen, with an aqueous solution of the detergent bleach composition of claim 1.

* * * * *